United States Patent
Inoue et al.

(10) Patent No.: US 8,134,754 B2
(45) Date of Patent: Mar. 13, 2012

(54) IMAGE FORMING APPARATUS, IMAGE FORMING SYSTEM, AND IMAGE PROCESSING APPARATUS

(75) Inventors: Takashi Inoue, Tokyo (JP); Yoshiaki Utsubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 788 days.

(21) Appl. No.: 11/533,056

(22) Filed: Sep. 19, 2006

(65) Prior Publication Data
US 2007/0064257 A1 Mar. 22, 2007

(30) Foreign Application Priority Data

Sep. 20, 2005 (JP) ................................ 2005-272190
Sep. 30, 2005 (JP) ................................ 2005-286621

(51) Int. Cl.
*H04N 1/00* (2006.01)
*H04N 1/40* (2006.01)
(52) U.S. Cl. ................... 358/462; 358/405; 358/426.02; 358/444
(58) Field of Classification Search ................... 358/1.9, 358/1.14, 2.1, 3.1, 1.15, 401, 405, 426.02, 358/426.06, 426.11; 382/303–307, 112, 382/172, 190, 193, 194, 201–282; 707/705.731, 707/749, 754
See application file for complete search history.

(56) References Cited

U.S. PATENT DOCUMENTS

| | | | |
|---|---|---|---|
| 6,123,258 A * | 9/2000 | Iida | 235/375 |
| 6,321,334 B1* | 11/2001 | Jerger et al. | 726/1 |
| 6,650,794 B1* | 11/2003 | Aoki | 382/306 |
| 2002/0154332 A1* | 10/2002 | Inai et al. | 358/1.15 |
| 2003/0038974 A1* | 2/2003 | Hu | 358/3.06 |
| 2005/0058487 A1 | 3/2005 | Utsubo | |
| 2006/0044339 A1* | 3/2006 | Mizutani et al. | 347/15 |

FOREIGN PATENT DOCUMENTS

| | | |
|---|---|---|
| JP | 1318114 A | 12/1989 |
| JP | 6187334 A | 7/1994 |
| JP | 10-207661 A | 8/1998 |
| JP | 11321029 A | 11/1999 |
| JP | 2000132352 A | 5/2000 |
| JP | 2000332982 A | 11/2000 |
| JP | 2001088407 A | 4/2001 |
| JP | 2002215373 A | 8/2002 |
| JP | 2005-074894 A | 3/2005 |

* cited by examiner

*Primary Examiner* — Benny Tieu
*Assistant Examiner* — Ngon Nguyen
(74) *Attorney, Agent, or Firm* — Panitch Schwarze Belisario & Nadel LLP

(57) ABSTRACT

An image forming apparatus which executes an image creation on the basis of image creation data including a first document identifier has: an input unit which inputs the image creation data; a storing unit which previously stores a second document identifier for limiting an output; and a discriminating unit which discriminates permission or inhibition of the output on the basis of the second document identifier stored in the storing unit and the first document identifier included in the inputted image creation data. The image creation is performed on the basis of only the image creation data which has previously been permitted, thereby preventing the unnecessary image creation from being executed.

13 Claims, 22 Drawing Sheets

EXAMPLE OF IMAGE CREATION DATA

FIG.15

| | PIXEL LIMIT DENSITY |
|---|---|
| TOTAL | 100% |
| CYAN | 15% |
| MAGENTA | 15% |
| YELLOW | 15% |
| BLACK | 15% |

FIG.16

| | CONTROL CONTENTS |
|---|---|
| TOTAL | 1 |
| CYAN | 1 |
| MAGENTA | 1 |
| YELLOW | 1 |
| BLACK | 1 |

1:LIMITATION IS NECESSARY, 0:LIMITATION IS UNNECESSARY

FIG.21

| | APPLICATION NAME |
|---|---|
| NON-TARGET APPLICATION DATA | WORD PROCESSOR SOFTWARE |
| | SPREADSHEET SOFTWARE |
| | E-MAIL SOFTWARE |

IMAGE FORMING APPARATUS, IMAGE FORMING SYSTEM, AND IMAGE PROCESSING APPARATUS

BACKGROUND OF THE INVENTION

1. Field of the Invention

The invention relates to an image forming apparatus, an image forming system, and an image processing apparatus.

2. Description of the Related Art

Hitherto, in an image forming apparatus such as a printer or the like connected to a network, print data formed by a client apparatus likewise connected to the network is received and printed. In this case, since anyone can easily print by operating the client apparatus, the print data whose printing is inherently unnecessary is often printed and an increase in costs due to the unnecessary printing of the print data becomes a problem.

To solve such a problem, there has been proposed a technique for discriminating permission or inhibition of the printing on the basis of the number of print copies, a kind of print sheet, a special printing function, or the like which has been set in accordance with authority to use allocated to each of the registered users (for example, refer to JP-A-2005-74894).

However, in the conventional image forming apparatus, even in the case of the unnecessary print data, the printing is enabled so long as the number of print copies is within a set limit number.

SUMMARY OF THE INVENTION

It is, therefore, an object of the invention to provide an image forming apparatus, an image forming system, and an image processing apparatus.

According to the present invention, there is provided an image forming apparatus which receives print information including print data from an upper apparatus and subsequently executes a printing process based on image data that is formed on the basis of the print information, comprising:

a storing unit in which pixel limit density information showing a pixel density of the image data serving as a limit reference has been stored;

a print information obtaining unit which obtains density information from the print information;

an arithmetic operating unit which arithmetically operates pixel density information of the image data from the obtained density information;

a print permission/inhibition discriminating unit which compares the arithmetically operated pixel density information with the pixel limit density information in the storing unit and, if the pixel density is larger than the pixel limit density, determines that printing is not permitted; and a print processing unit which stops the printing process when the print permission/inhibition discriminating unit determines that the printing is not permitted.

Moreover, in the image forming apparatus, the print information includes print attribute information comprising recording paper dimension data showing dimensions of recording paper and image resolution data showing a resolution of an image, the print information obtaining unit obtains the print attribute information from the print information, and the image forming apparatus may further comprise: a sheet pixel obtaining unit which obtains sheet pixel information showing the maximum number of recordable pixels of the recording paper on the basis of the obtained print attribute information; an image pixel obtaining unit which obtains image pixel information showing the number of pixels existing in the formed image data; and a pixel density obtaining unit which obtains the pixel density information showing the pixel density of the image data on the basis of the obtained sheet pixel information and the obtained image pixel information.

Moreover, in the image forming apparatus, the pixel limit density information indicates the pixel limit density of each color of the image data and a total pixel limit density of the colors of the image data which are used as limit references of high-density printing, the print attribute information includes print color designation data indicative of either a color image or a monochromatic image, if the print color designation data of the print attribute information indicates the color image, the sheet pixel obtaining unit obtains the sheet pixel information showing the maximum number of recordable pixels of the recording paper upon color printing, if the print color designation data indicates the color image, the image pixel obtaining unit obtains the image pixel information showing the number of pixels of each color existing in the image data and the image pixel information showing the total number of pixels of the colors existing in the image data, the pixel density obtaining unit obtains the pixel density information showing the pixel density of each color of the image data and the pixel density information showing the total pixel density of the colors of the image data on the basis of the obtained sheet pixel information and each of the obtained image pixel information, and the print permission/inhibition discriminating unit compares the obtained pixel density information of each color and the obtained total pixel density information of the colors with the pixel limit density information of each color and the total pixel limit density information of the colors in the storing unit and, if each of the pixel densities is larger than the corresponding pixel limit density, determines that the printing is not permitted.

Moreover, in the image forming apparatus, the print permission/inhibition discriminating unit compares the obtained pixel density information of each color and the obtained total pixel density information of the colors with the pixel limit density information of each color and the total pixel limit density information of the colors in the storing unit and, if either of the pixel densities is larger than the corresponding pixel limit density, determines that the printing is not permitted.

Moreover, the image forming apparatus may further comprise a notifying unit which, when the print processing unit stops the printing process, sends a print stop signal showing that the printing process has been stopped to the upper apparatus.

Further, according to the present invention, there is provided an image forming system having an image forming apparatus which receives print information including print data from an upper apparatus and subsequently executes a printing process based on image data that is formed on the basis of the print information, wherein the image forming system includes a storing unit in which pixel limit density information showing a pixel density of the image data serving as a limit reference has been stored, and the image forming apparatus comprises:

a print information obtaining unit which obtains density information from the print information;

an arithmetic operating unit which arithmetically operates pixel density information of the image data from the obtained density information;

a print permission/inhibition discriminating unit which compares the arithmetically operated pixel density information with the pixel limit density information in the storing unit and, if the pixel density is larger than the pixel limit density, determines that printing is not permitted; and a print processing unit which stops the printing process when the print permission/inhibition discriminating unit determines that the printing is not permitted.

Moreover, in the image forming system, the print information includes print attribute information comprising recording paper dimension data showing dimensions of recording paper and image resolution data showing a resolution of an image, the print information obtaining unit obtains the print attribute information from the print information, and the image forming apparatus further comprises: a sheet pixel obtaining unit which obtains sheet pixel information showing the maximum number of recordable pixels of the recording paper on the basis of the obtained print attribute information; an image pixel obtaining unit which obtains image pixel information showing the number of pixels existing in the formed image data; and a pixel density obtaining unit which obtains the pixel density information showing the pixel density of the image data on the basis of the obtained sheet pixel information and the obtained image pixel information.

Moreover, in the image forming system, the pixel limit density information indicates the pixel limit density of each color of the image data and a total pixel limit density of the colors of the image data which are used as limit references of high-density printing, the print attribute information includes print color designation data indicative of either a color image or a monochromatic image, if the print color designation data indicates the color image, the sheet pixel obtaining unit obtains the sheet pixel information showing the maximum number of recordable pixels of the recording paper upon color printing, if the print color designation data indicates the color image, the image pixel obtaining unit obtains the image pixel information showing the number of pixels of each color existing in the image data and the image pixel information showing the total number of pixels of the colors existing in the image data, the pixel density obtaining unit obtains the pixel density information showing the pixel density of each color of the image data and the pixel density information showing the total pixel density of the colors of the image data on the basis of the obtained sheet pixel information and each of the obtained image pixel information, and when the pixel density obtaining unit obtains the pixel density information, the print permission/inhibition discriminating unit obtains each of the pixel limit density information from the storing unit, compares the obtained pixel limit density information of each color and the obtained total pixel limit density information of the colors with the respective pixel density information and, if each of the pixel densities is larger than the corresponding pixel limit density, determines that the printing is not permitted.

Moreover, in the image forming system, when the pixel density obtaining unit obtains the pixel density information, the print permission/inhibition discriminating unit obtains each of the pixel limit density information from the storing unit, compares the obtained pixel limit density information of each color and the obtained total pixel limit density information of the colors with the respective pixel density information and, if either of the pixel densities is larger than the corresponding pixel limit density, determines that the printing is not permitted.

Moreover, in the image forming system, the image forming apparatus further has a notifying unit which, when the print processing unit stops the printing process, sends a print stop signal showing that the printing process has been stopped to the upper apparatus.

Furthermore, according to the present invention, there is provided an image forming apparatus which receives print information including application data showing a name of an application of a print requesting source and print data from an upper apparatus and subsequently executes a printing process based on image data that is formed on the basis of the print information, comprising:

a storing unit in which non-target application data showing the application name out of limitation targets has been stored;

a print information obtaining unit which obtains the application data from the print information;

a print permission/inhibition discriminating unit which searches the storing unit on the basis of the obtained application data and, if the non-target application data which coincides with the application data is not stored, determines that printing is not permitted; and a print processing unit which stops the printing process when the print permission/inhibition discriminating unit determines that the printing is not permitted.

Moreover, the image forming apparatus may further comprise a notifying unit which, when the print processing unit stops the printing process, sends a print stop signal showing that the printing process has been stopped to the upper apparatus.

Furthermore, according to the present invention, there is provided an image forming system having an image forming apparatus which receives print information including application data showing a name of an application of a print requesting source and print data from an upper apparatus and subsequently executes a printing process based on image data that is formed on the basis of the print information, wherein the image forming system includes a storing unit in which non-target application data showing the application name out of limitation targets has been stored, and the image forming apparatus comprises:

a print information obtaining unit which obtains the application data from the print information;

a print permission/inhibition discriminating unit which searches the storing unit on the basis of the obtained application data and, if the non-target application data which coincides with the application data is not stored, determines that printing is not permitted; and a print processing unit which stops the printing process when the print permission/inhibition discriminating unit determines that the printing is not permitted.

Moreover, in the image forming system, the image forming apparatus further has a notifying unit which, when the print processing unit stops the printing process, sends a print stop signal showing that the printing process has been stopped to the upper apparatus.

Furthermore, according to the present invention, there is provided an image forming apparatus which executes an image creation on the basis of image creation data including a first document identifier, comprising:

an input unit which inputs the image creation data;

a storing unit which previously stores a second document identifier for limiting an output; and a discriminating unit which discriminates permission or inhibition of the output on the basis of the second document identifier stored in the storing unit and the first document identifier included in the inputted image creation data.

Moreover, in the image forming apparatus, the image creation data includes first image creation information, the storing unit previously stores second image creation information, and the discriminating unit discriminates the permission or inhibition of the output on the basis of the second document identifier and the second image creation information stored in the storing unit and the first document identifier and the first image creation information included in the inputted image creation data.

Moreover, in the image forming apparatus, each of the first image creation information and the second image creation information includes at least one of the number of pages, a sheet size, and a media type.

Moreover, the image forming apparatus may further comprise a notifying unit which notifies that the discriminating unit has determined that the output is not permitted.

Moreover, in the image forming apparatus, each of the first document identifier and the second document identifier is a document name.

Moreover, in the image forming apparatus, the first document identifier is application data showing an application name of a print requesting source of an upper apparatus, the second document identifier is non-target application data showing an application name out of limitation targets, the image forming apparatus has a print information obtaining unit which obtains the application data from print information of the image creation data, the discriminating unit has a print permission/inhibition discriminating unit which searches the storing unit on the basis of the obtained application data as the first document identifier and, if the non-target application data as a second document identifier which coincides with the application data is not stored, determines that printing is not permitted, and the image forming apparatus has a print processing unit which stops the image creation when the print permission/inhibition discriminating unit determines that the printing is not permitted.

Furthermore, according to the present invention, there is provided an image forming system which executes an image creation on the basis of image creation data including a first document identifier, comprising:

an input unit which inputs the image creation data;

a storing unit which previously stores a second document identifier for limiting an output; and a discriminating unit which discriminates permission or inhibition of the output on the basis of the second document identifier stored in the storing unit and the first document identifier included in the inputted image creation data.

Moreover, in the image forming system, the first document identifier is application data showing an application name of a print requesting source of an upper apparatus, the second document identifier is non-target application data showing an application name out of limitation targets, the image forming system has a print information obtaining unit which obtains the application data from print information of the image creation data, the discriminating unit has a print permission/inhibition discriminating unit which searches the storing unit on the basis of the obtained application data as the first document identifier and, if the non-target application data as a second document identifier which coincides with the application data is not stored, determines that printing is not permitted, and the image forming system has a print processing unit which stops the image creation when the print permission/inhibition discriminating unit determines that the printing is not permitted.

Moreover, in the image forming system, the image creation data includes first image creation information, the storing unit previously stores second image creation information, and the discriminating unit discriminates the permission or inhibition of the output on the basis of the second document identifier and the second image creation information stored in the storing unit and the first document identifier and the first image creation information included in the inputted image creation data.

Moreover, in the image forming system, each of the first image creation information and the second image creation information includes at least one of the number of pages, a sheet size, and a media type.

Moreover, the image system may further comprise a notifying unit which notifies that the discriminating unit has determined that the output is not permitted.

Moreover, in the image forming system, each of the first document identifier and the second document identifier is a document name.

Furthermore, according to the present invention, there is provided an image processing apparatus comprising:

an image creation data forming unit which forms image creation data including a first document identifier;

a storing unit which previously stores a second document identifier for limiting an output; and a discriminating unit which discriminates permission or inhibition of the output on the basis of the second document identifier stored in the storing unit and the first document identifier included in the image creation data formed by the image creation data forming unit.

Moreover, in the image processing apparatus, the image creation data includes first image creation information, the storing unit previously stores second image creation information, and the discriminating unit discriminates the permission or inhibition of the output on the basis of the second document identifier and the second image creation information stored in the storing unit and the first document identifier and the first image creation information formed by the image creation data forming unit.

Moreover, in the image processing apparatus, each of the first image creation information and the second image creation information include at least one of the number of pages, a sheet size, and a media type.

Moreover, the image processing apparatus may further comprise a notifying unit which notifies that the discriminating unit has determined that the output is not permitted.

Moreover, in the image processing apparatus, each of the first document identifier and the second document identifier is a document name.

According to the invention, the image forming apparatus discriminates the permission or inhibition of the output on the basis of the document identifier included in the image creation data. Therefore, the image creation is executed on the basis of only the image creation data which has previously been permitted and the unnecessary image creation is not performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a diagram showing an example of pixel limit density information;

FIG. 16 is a diagram showing an example of discrimination control information;

FIG. 21 is a diagram showing an example of non-target application data;

DETAILED DESCRIPTION OF THE PREFERRED EMBODIMENTS

Embodiments of the invention will be described in detail hereinbelow with reference to the drawings.

Embodiment 1

Construction of the Embodiment 1

Figure 1:
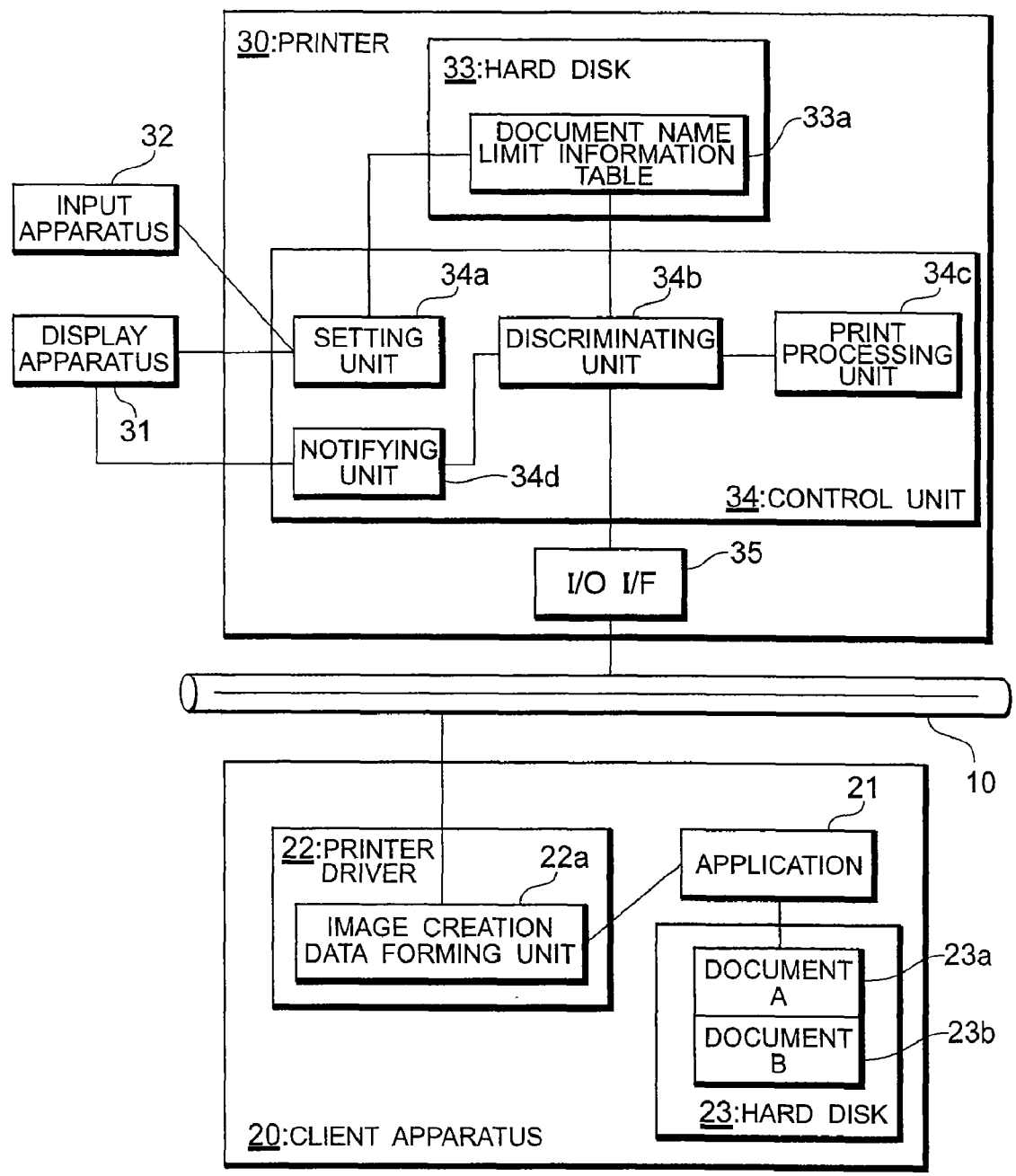
FIG. 1 is a block diagram showing a construction of an image forming system in the first embodiment of the invention.
Figure 2:
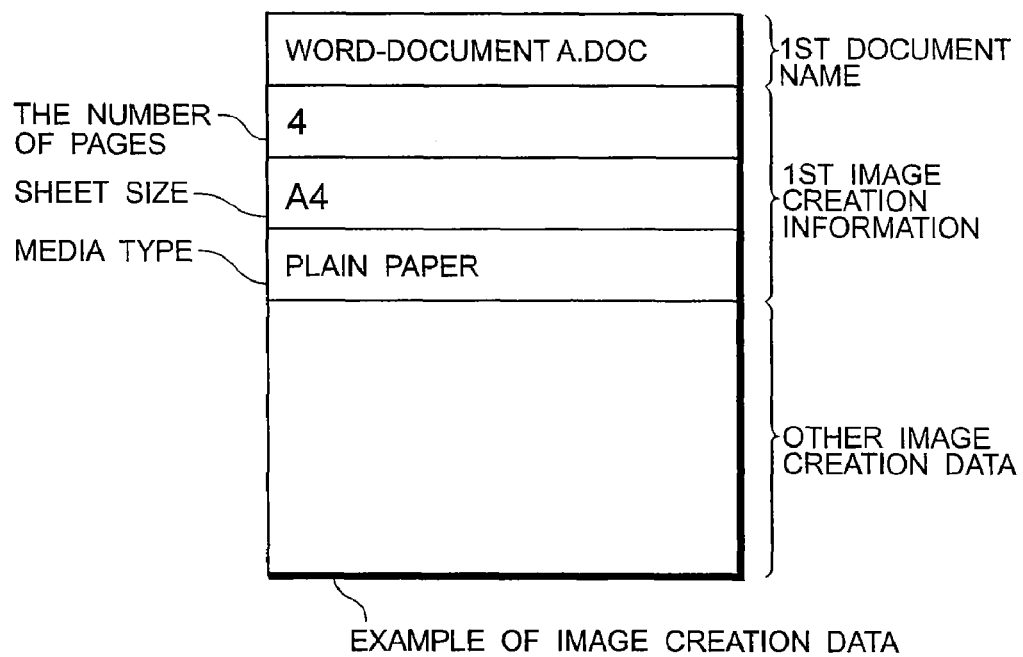
FIG. 2 is a diagram showing an example of image creation data in the first embodiment of the invention.

FIG. 1 is a block diagram showing a construction of an image forming system in the first embodiment of the invention. FIG. 2 is a diagram showing an example of image creation data in the first embodiment of the invention.

As shown in FIG. 1, the image forming system in the embodiment is set in such an environment that a client apparatus 20 as an image processing apparatus and a printer 30 as an image forming apparatus are connected through a network 10 and they can communicate with each other.

The network 10 is a wired or wireless communication line network and, for example, an LAN (Local Area Network), a WAN (Wide Area Network), Intranet, or the like can be used as a network 10. However, any kind of communication line network can be used or the network 10 may be constructed by a plurality of communication line networks.

The client apparatus 20 is a computer having: an arithmetic operating unit such as CPU, MPU, or the like; a storing unit such as magnetic disk, semiconductor memory, or the like; a display unit such as CRT, LCD (liquid crystal display), or the like; an input unit such as a keyboard or the like; a communication interface; and the like. The client apparatus 20 is, for example, a personal computer, a workstation, or the like and can be constructed by any other similar apparatus. From a viewpoint of functions, the client apparatus 20 has an application 21, a printer driver 22, and a hard disk 23. The client apparatus 20 forms the image creation data including a document name as a first document identifier and sends it to the printer 30.

The application 21 is general software for performing creation, printing, and the like of a document or an image. When a document A 23a or a document B 23b stored in the hard disk 23 is opened and the printing is instructed, the application 21 sends the document name and a print job to the printer driver 22. The document name is a name for the application 21 to identify the document A 23a or the document B 23b. For example, the document name is a file name or a name obtained by adding an application name to the file name.

The printer driver 22 has an image creation data forming unit 22a. On the basis of the document name and the print job received from the application 21, the image creation data forming unit 22a forms the image creation data as shown in FIG. 2 including the document name for allowing the printer 30 to execute the printing and sends it to the printer 30.

The hard disk 23 is a storing unit to store the document formed by the application 21 and stores the document A 23a and the document B 23b. The document A 23a and the document B 23b are the documents formed by the application 21.

The printer 30 is an apparatus for forming an image onto recording paper on the basis of the received image creation data and printing. The printer 30 may be an arbitrary kind of printer such as ink jet type printer, electrophotographic type printer, thermal transfer type printer, or the like. A display apparatus 31 comprising a CRT, an LCD, or the like for displaying and an input apparatus 32 comprising a keyboard, a mouse, and the like for inputting information from the outside are connected to the printer 30. The printer 30 also has: a hard disk 33 as a storing unit; a control unit 34; and an input/output interface (I/O interface) 35 as an input unit.

The hard disk 33 has a document name limit information table 33a. A permission document name as a second document identifier to permit the printing is stored into the document name limit information table 33a. A wild card "*" indicative of an arbitrary character train can be used as a permission document name.

The control unit 34 has a setting unit 34a, a discriminating unit 34b, a print processing unit 34c, and a notifying unit 34d.

The setting unit 34a allows the display apparatus 31 to display a setting display screen 40, which will be explained hereinafter, for inputting the permission document name to permit the printing. On the basis of the information inputted from the input apparatus 32, the setting unit 34a stores the permission document name to permit the printing into the document name limit information table 33a.

The discriminating unit 34b obtains the document name as a first document identifier from the image creation data received from the client apparatus 20. If the document name coincides with the permission document name stored in the document name limit information table 33a, the discriminating unit 34b determines that the printing is permitted, and sends the image creation data to the print processing unit 34c. If they do not coincide, the discriminating unit 34b determines that the printing is not permitted, and notifies the notifying unit 34d that the printing is not permitted. If the wild card "*" indicative of the arbitrary character train is used for a permission document name, the discriminating unit 34b discriminates about the coincidence or dissidence in consideration of the wild card. For example, in the case of the permission document name "document A*", it is determined that the document names of "document A", "document A1", and "document ABC" coincide with the permission document name and it is determined that the document name of "document B" does not coincide with the permission document name.

Further, the print processing unit 34c executes the printing on the basis of the image creation data sent from the discriminating unit 34b, and the process is finished. If the fact that the printing is not permitted is notified from the discriminating unit 34b, the notifying unit 34d allows the display apparatus 31 to display a message showing that the printing is not permitted.

The I/O interface 35 receives the image creation data through the network 10.

The setting display screen 40 which is displayed on the display apparatus 31 will now be explained hereinafter.

Figure 3:
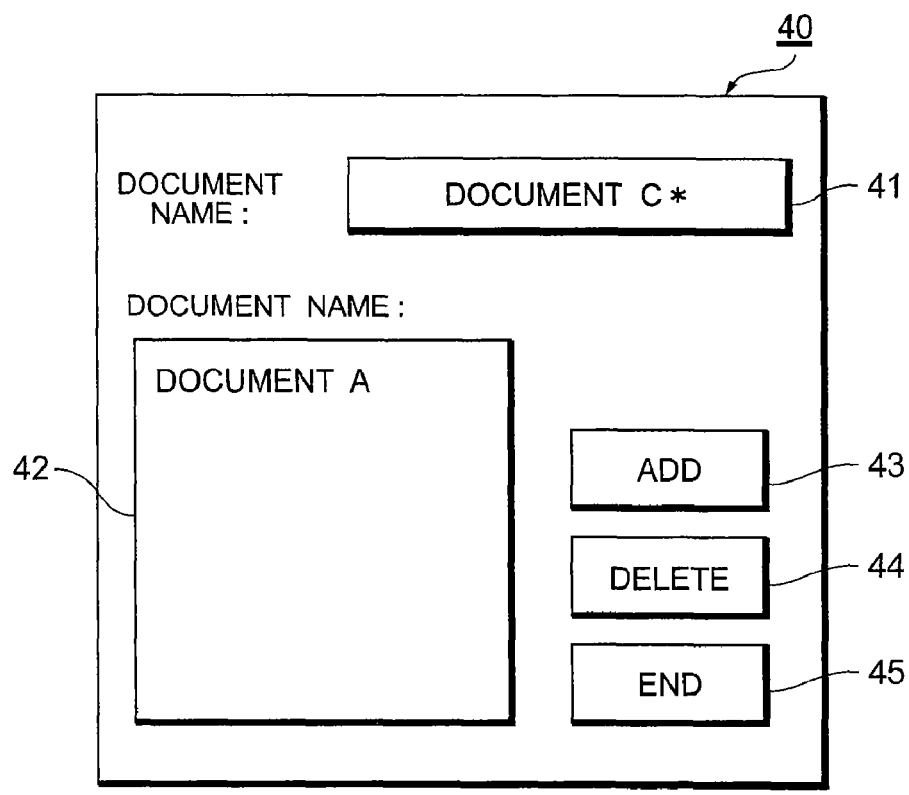
FIG. 3 is a diagram showing a display example of a setting display screen in the first embodiment of the invention.

FIG. 3 is a diagram showing a display example of the setting display screen in the first embodiment of the invention.

As shown in FIG. 3, the setting display screen 40 has a document name input column 41, a document name display column 42, an add button 43, a delete button 44, and an end button 45. The document name input column 41 is a column to input the permission document name. The document name display column 42 is a column to display the permission document names and select the permission document name to be deleted. When the desired permission document name to be deleted is selected, it is inversely displayed.

The add button 43 is clicked to add the permission document name inputted into the document name input column 41 to the document name display column 42. The delete button 44 is clicked to delete the permission document name selected in the document name display column 42. The end button 45 is clicked to store the permission document name displayed in the document name display column 42 into the document name limit information table 33a, close the setting display screen 40, and finish the process.

The operation of the image forming system with the above construction will now be described. First, the operation in the case of setting the document name limit information table 33a by the printer 30 will be described.

Figure 4:
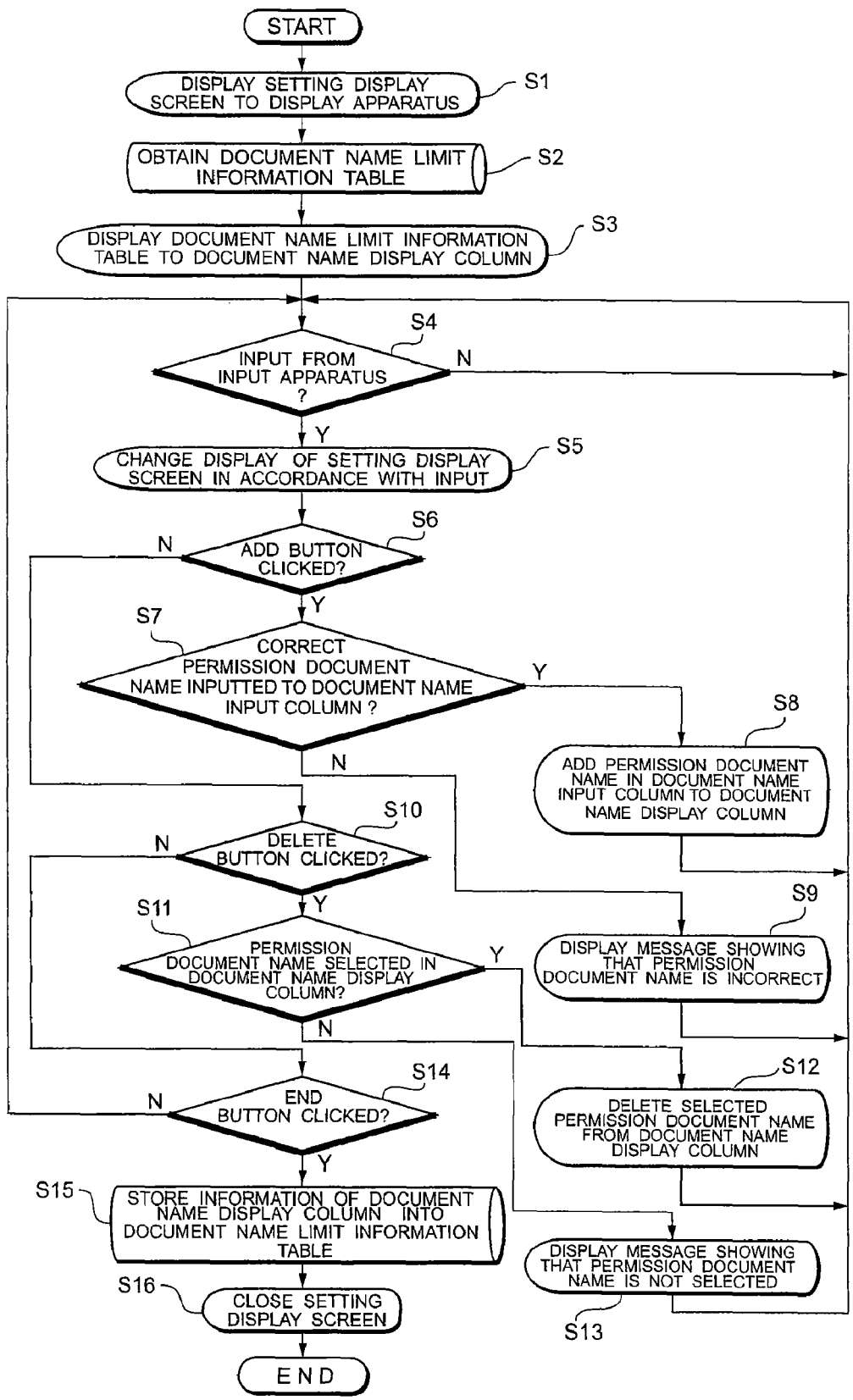
FIG. 4 is a flowchart showing the operation of a setting unit of a printer in the first embodiment of the invention.

FIG. 4 is a flowchart showing the operation of the setting unit of the printer in the first embodiment of the invention.

First, the setting unit 34a allows the display apparatus 31 to display the setting display screen 40, reads the document name limit information table 33a, and displays it into the document name display column 42. Subsequently, whether or not there is an input from the input apparatus 32 is discriminated. If there is the input, the display contents are changed on the basis of the input.

Then, whether or not the add button 43 has been clicked is discriminated. If it has been clicked, whether or not the correct permission document name has been inputted to the document name input column 41 is discriminated. If it has been inputted, the permission document name in the document name input column 41 is added to the document name display column 42 and displayed. If the correct permission document name is not inputted to the document name input column 41, a message showing that the permission document name is incorrect is displayed to the display apparatus 31.

Subsequently, whether or not the delete button 44 has been clicked is discriminated. If it has been clicked, whether or not the permission document name has been selected in the document name display column 42 is discriminated. If it has been selected, the selected permission document name is deleted from the document name display column 42. If the permission document name is not selected, a message showing that the permission document name is not selected is displayed to the display apparatus 31.

Subsequently, whether or not the end button 45 has been clicked is discriminated. If it has been clicked, the information in the document name display column 42 is stored in the document name limit information table 33a, the setting display screen 40 is closed, and the process is finished.

The flowchart will now be described.

Step S1: The setting display screen 40 is displayed to the display apparatus 31.

Step S2: The document name limit information table 33a is obtained.

Step S3: The document name limit information table 33a is displayed to the document name display column 42.

Step S4: Whether or not there is an input from the input apparatus 32 is discriminated. If there is the input from the input apparatus 32, step S5 follows. If there is no input from the input apparatus 32, the system enters the standby mode.

Step S5: The display of the setting display screen 40 is changed in accordance with the input.

Step S6: Whether or not the add button 43 has been clicked is discriminated. If the add button 43 has been clicked, step S7 follows. If the add button 43 is not clicked, step S10 follows.

Step S7: Whether or not the correct permission document name has been inputted to the document name input column 41 is discriminated. If the correct permission document name has been inputted to the document name input column 41, step S8 follows. If the correct permission document name is not inputted to the document name input column 41, step S9 follows.

Step S8: The permission document name in the document name input column 41 is added to the document name display column 42.

Step S9: A message showing that the permission document name is incorrect is displayed to the display apparatus 31.

Step S10: Whether or not the delete button 44 has been clicked is discriminated. If the delete button 44 has been clicked, step S11 follows. If the delete button 44 is not clicked, step S14 follows.

Step S11: Whether or not the permission document name has been selected in the document name display column 42 is discriminated. If the permission document name has been selected in the document name display column 42, step S12 follows. If the permission document name is not selected in the document name display column 42, step S13 follows.

Step S12: The selected permission document name is deleted from the document name display column 42.

Step S13: A message showing that the permission document name is not selected is displayed to the display apparatus 31.

Step S14: Whether or not the end button 45 has been clicked is discriminated. If the end button 45 has been clicked, step S15 follows. If the end button 45 is not clicked, the processing routine is returned to step S4.

Step S15: The information in the document name display column 42 is held in the document name limit information table 33a.

Step S16: The setting display screen 40 is closed and the process is finished.

The operation in the case where the printing has been instructed will now be described.

Figure 5:
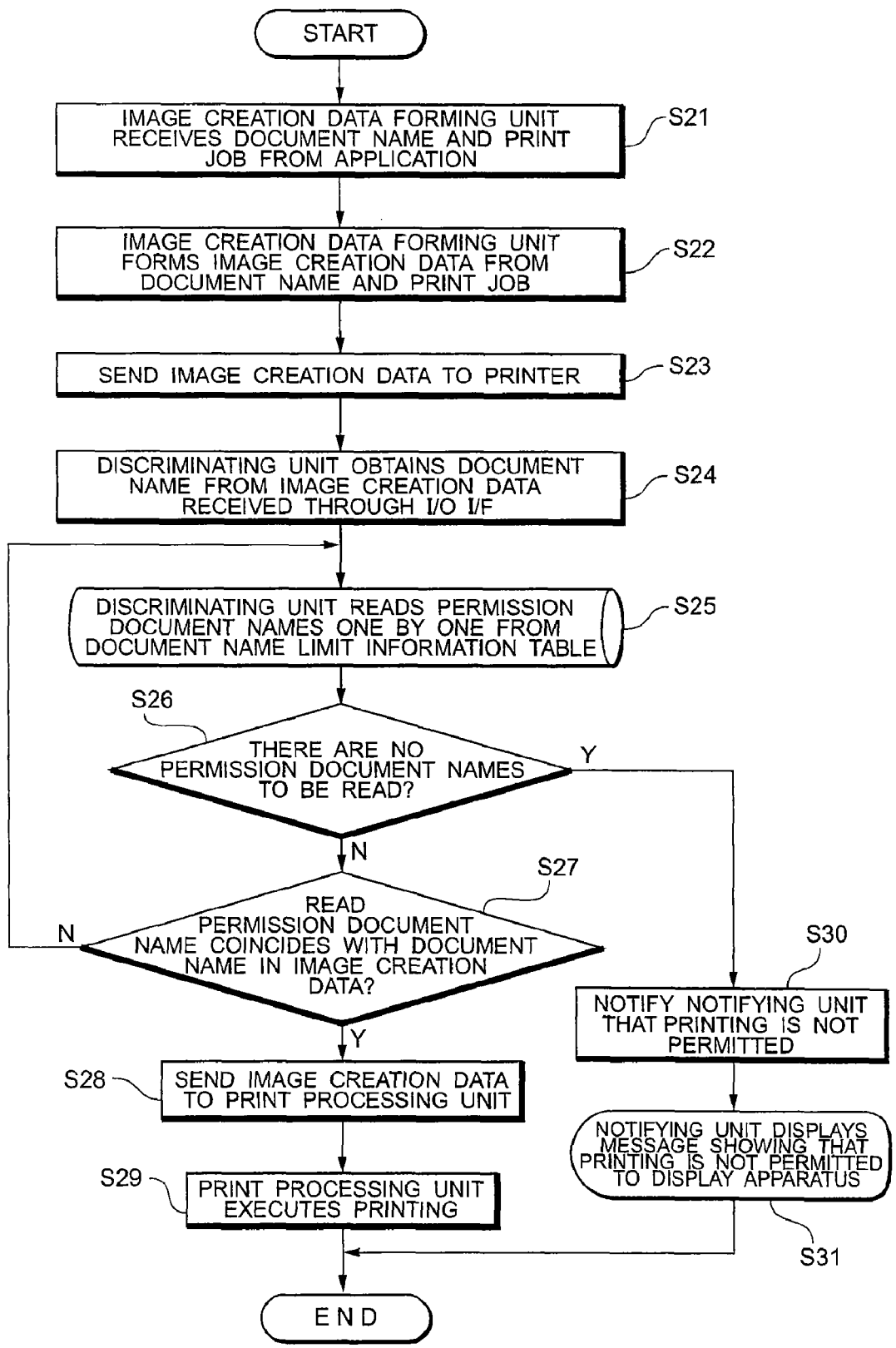
FIG. 5 is a flowchart showing the operation of the image forming system in the first embodiment of the invention.

FIG. 5 is a flowchart showing the operation of the image forming system in the first embodiment of the invention.

The operation in the case where the printing of the document opened by the application 21 in the client apparatus 20 has been instructed will now be described.

First, when the printing is instructed from the application 21, the document name and the print job are sent to the image creation data forming unit 22a from the application 21. The image creation data forming unit 22a forms the image creation data including the document name from the received document name and print job and sends it to the printer 30.

Subsequently, the discriminating unit 34b obtains the document name from the image creation data received through the I/O interface 35 and reads the permission document names one by one from the document name limit information table 33a. The presence or absence of the permission document names to be read out is discriminated. If there are no permission document names to be read out, the notifying unit 34d is notified that the printing is not permitted. The notifying unit 34d allows the display apparatus 31 to display a message showing that the printing is not permitted, and the process is finished.

If the permission document names to be read out exist, whether or not the document name in the image creation data coincides with the read-out permission document name is discriminated. If they coincide, the image creation data is sent to the print processing unit 34c. Thus, the print processing unit 34c executes the printing on the basis of the received image creation data, and the process is finished.

The flowchart will now be described.

Step S21: The image creation data forming unit 22a receives the document name and the print job from the application 21.

Step S22: The image creation data forming unit 22a forms the image creation data from the document name and the print job.

Step S23: The image creation data is sent to the printer 30.

Step S24: The discriminating unit 34b obtains the document name from the image creation data received through the I/O interface 35.

Step S25: The discriminating unit 34b reads the permission document names one by one from the document name limit information table 33a.

Step S26: The presence or absence of the permission document names to be read out is discriminated. If there are no permission document names to be read out, step S30 follows. If the permission document names to be read out exist, step S27 follows.

Step S27: Whether or not the read-out permission document name coincides with the document name in the image creation data is discriminated. If the read-out permission document name coincides with the document name in the image creation data, step S28 follows. If the read-out permission document name does not coincide with the document name in the image creation data, the processing routine is returned to step S25.

Step S28: The image creation data is sent to the print processing unit 34c.

Step S29: The print processing unit 34c executes the printing, and the process is finished.

Step S30: The notifying unit 34d is notified that the printing is not permitted.

Step S31: The notifying unit 34d allows the display apparatus 31 to display the message showing that the printing is not permitted, and the process is finished.

Although the embodiment has been described with respect to the example in which the client apparatus 20 and the printer 30 are connected through the network 10, that is, they are network-connected, the client apparatus 20 and the printer 30 can be also connected in parallel or connected by a USB (Universal Serial Bus). Although the embodiment has been described with respect to the example in which the hard disk 33 is used as a storing unit, a flash memory may be used as a storing unit. Although the embodiment has been described with respect to the example in which one client apparatus 20 is used, a plurality of client apparatuses 20 may be used. Further, although the embodiment has been described with respect to the example in which one printer 30 is used, a plurality of printers 30 may be used. Although the embodiment has been described with respect to the example in which the input apparatus 32, display apparatus 31, setting unit 34a, and notifying unit 34d are provided for the printer 30, the input apparatus 32, display apparatus 31, setting unit 34a, and notifying unit 34d can be also provided for the client apparatus 20.

In the embodiment as mentioned above, the permission document name to permit the printing is set. Therefore, it is possible to permit the printing of the image creation data in which the permission document name has been set and to inhibit the printing of the image creation data of other document names.

Embodiment 2

The second embodiment of the invention will now be described. The component elements having the same or similar constructions as those in the first embodiment are designated by the same reference numerals and their description is omitted. Explanation of substantially the same operations and effects as those in the first embodiment is also omitted.

Figure 6:
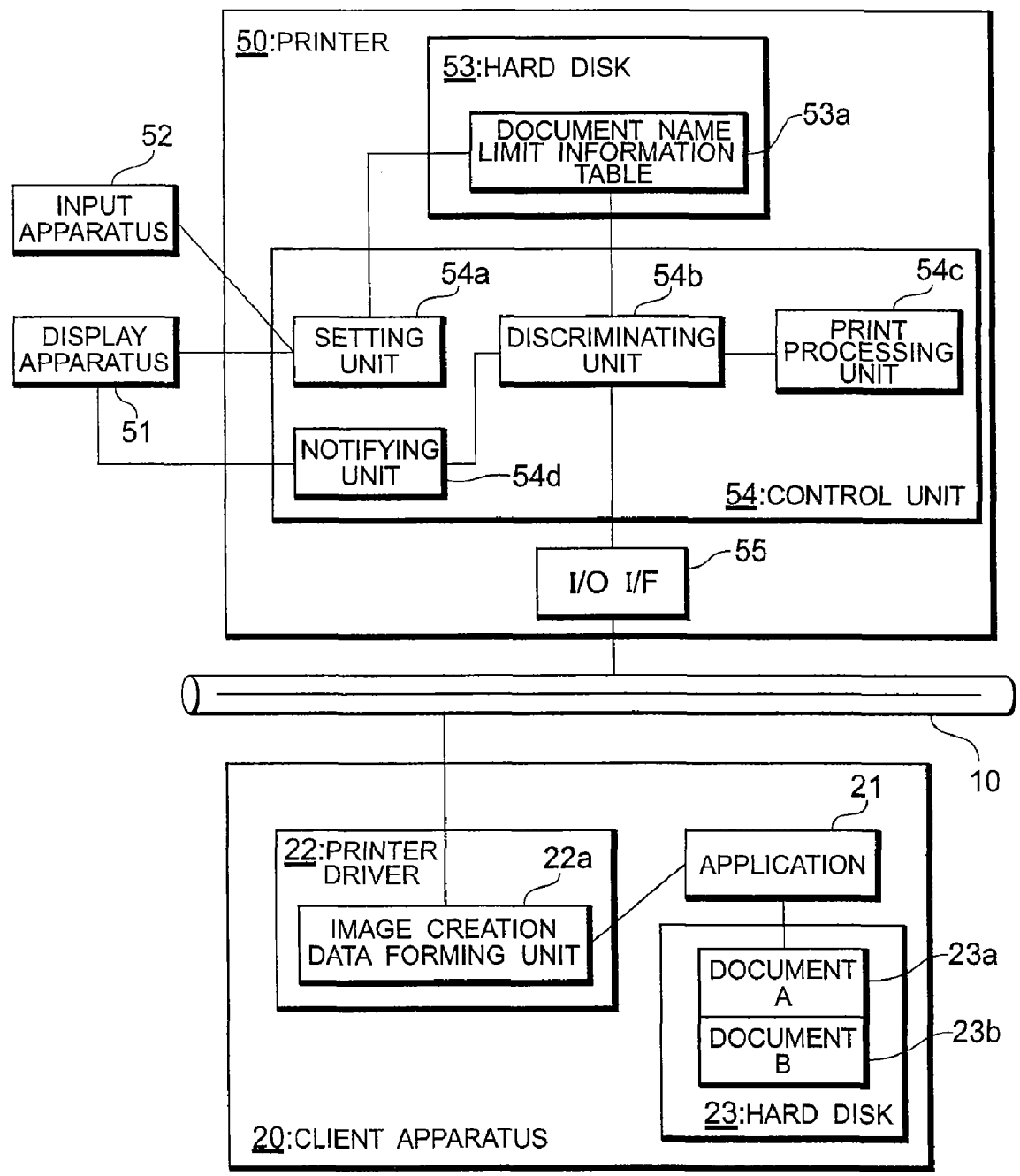
FIG. 6 is a block diagram showing a construction of an image forming system in the second embodiment of the invention.

FIG. 6 is a block diagram showing a construction of an image forming system in the second embodiment of the invention.

As shown in FIG. 6, the image forming system of the second embodiment is set in such an environment that the client apparatus 20 as an image processing apparatus and a printer 50 as an image forming apparatus are connected through the network 10 and they can communicate with each other.

In the embodiment, the printer 50 is an apparatus which forms an image onto recording paper on the basis of the received image creation data and executes the printing. A display apparatus 51 such as CRT, LCD (liquid crystal display), or the like for displaying and an input apparatus 52 having a keyboard, a mouse, and the like for inputting information from the outside are connected to the printer 50. The printer 50 also has: a hard disk 53 as a storing unit; a control unit 54; and an input/output interface (I/O interface) 55 as an input unit.

The hard disk 53 has a document name limit information table 53a. A permission document name as a second document identifier to permit the printing and the number of permission pages (as second image creation information) in which the printing of the document is permitted are stored in the document name limit information table 53a. The wild card "*" indicative of an arbitrary character train can be used as a permission document name.

The control unit 54 has a setting unit 54a, a discriminating unit 54b, a print processing unit 54c, and a notifying unit 54d.

The setting unit 54a allows the display apparatus 51 to display a setting display screen 60, which will be explained hereinafter, for inputting the permission document name to permit the printing and the number of permission pages. On the basis of the information inputted from the input apparatus 52, the setting unit 54a stores the permission document name to permit the printing into the document name limit information table 53a.

The discriminating unit 54b obtains the document name as a first document identifier and the number of permission pages as second image creation information from the image creation data received from the client apparatus 20 through the I/O interface 55. If the document name and the number of permission pages coincide with the permission document name and the number of permission pages stored in the document name limit information table 53a, the discriminating unit 54b determines that the printing is permitted, and sends the image creation data to the print processing unit 54c. If they do not coincide, the discriminating unit 54b determines that the printing is not permitted, and notifies the notifying unit 54d that the printing is not permitted. If the wild card "*" indicative of the arbitrary character train is used for the permission document name, the discriminating unit 54b discriminates about the coincidence or dissidence in consideration of the wild card. For example, in the case of the permission document name "document A*", it is determined that the document names of "document A", "document A1", and "document ABC" coincide with the permission document name and it is determined that the document name of "document B" does not coincide with the permission document name.

Further, the print processing unit 54c executes the printing on the basis of the image creation data sent from the discriminating unit 54b, and the process is finished. If the fact that the printing is not permitted is notified from the discriminating unit 54b, the notifying unit 54d allows the display apparatus 51 to display a message showing that the printing is not permitted.

The I/O interface 55 receives the image creation data through the network 10.

The setting display screen 60 which is displayed on the display apparatus 51 will now be explained.

Figure 7:
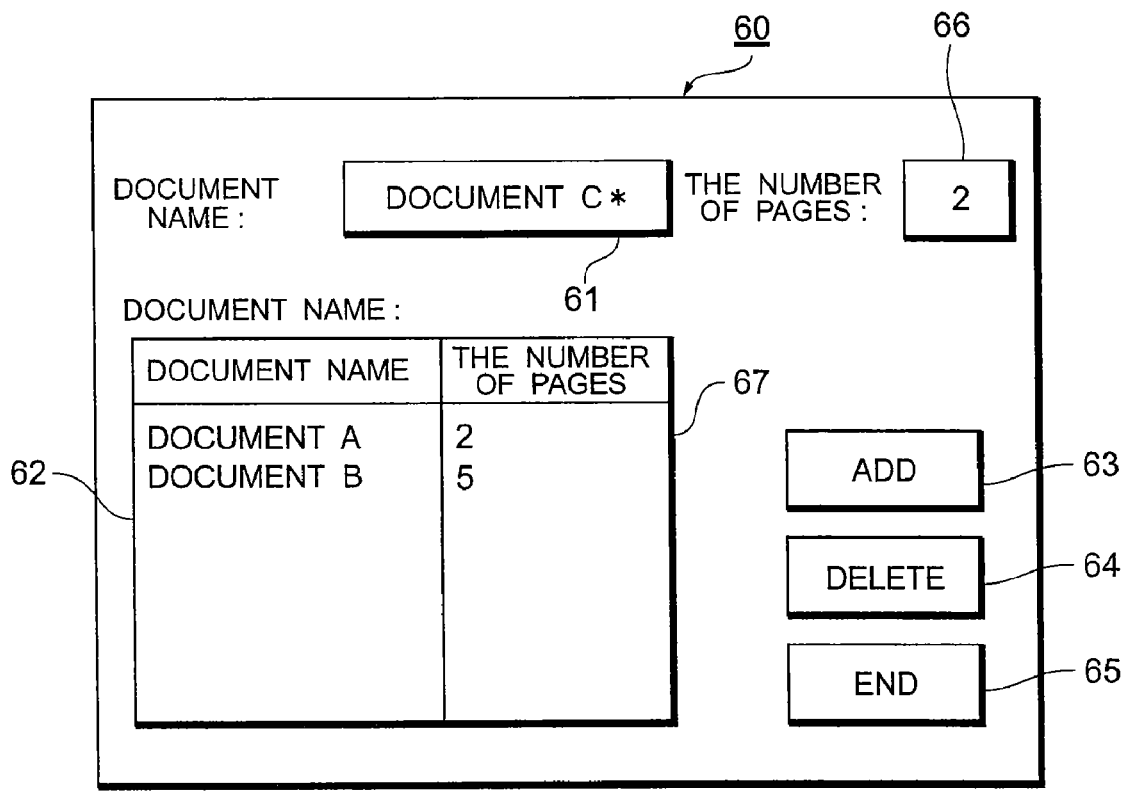
FIG. 7 is a diagram showing a display example of a setting display screen in the second embodiment of the invention.

FIG. 7 is a diagram showing a display example of the setting display screen in the second embodiment of the invention.

As shown in FIG. 7, the setting display screen 60 has a document name input column 61, a document name display column 62, an add button 63, a delete button 64, an end button 65, a page number input column 66, and a page number display column 67. The document name input column 61 is a column to input the permission document name. The document name display column 62 is a column to display the permission document names and select the permission document name to be deleted. When the desired permission document name to be deleted is selected, it is inversely displayed.

The page number input column 66 is a column for inputting the number of permission pages. The page number display column 67 is a column for displaying the number of permission pages. The add button 63 is clicked to add the permission document name inputted into the document name input column 61 to the document name display column 62 and to add the number of permission pages inputted into the page number input column 66 to the page number display column 67. The delete button 64 is clicked to delete the permission document name selected in the document name display column 62 and the number of permission pages in the corresponding page number display column 67. The end button 65 is clicked to store the permission document name displayed in the document name display column 62 and the number of permission pages displayed in the page number display column 67 into the document name limit information table 53a, close the setting display screen 60, and finish the process.

The operation of the image forming system in the embodiment will now be described. First, the operation in the case of setting the document name limit information table 53a by the printer 50 will be described.

Figure 8:
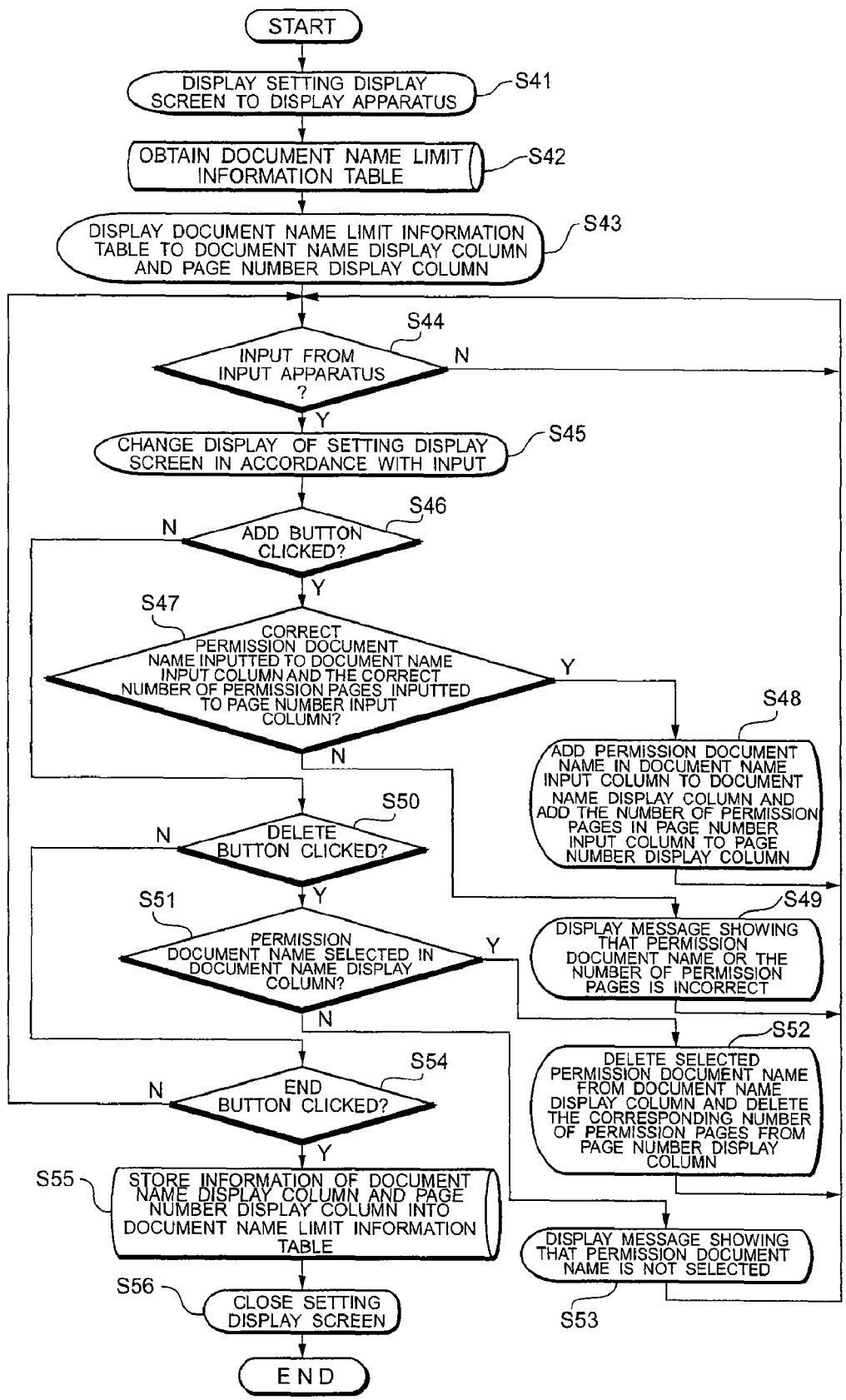
FIG. 8 is a flowchart showing the operation of a setting unit of a printer in the second embodiment of the invention.

FIG. 8 is a flowchart showing the operation of the setting unit of the printer in the second embodiment of the invention.

First, the setting unit 54a allows the display apparatus 51 to display the setting display screen 60, reads the document name limit information table 53a, and displays it to the document name display column 62 and the page number display column 67. Subsequently, whether or not there is an input from the input apparatus 52 is discriminated. If there is the input, the display contents are changed on the basis of the input.

Then, whether or not the add button 63 has been clicked is discriminated. If it has been clicked, whether or not the correct permission document name has been inputted to the document name input column 61 and the correct number of permission pages has been inputted into the page number input column 66 is discriminated. If they have been inputted, the permission document name in the document name input column 61 is added to the document name display column 62 and displayed and the number of permission pages in the page number input column 66 is added to the page number display column 67 and displayed. If the correct permission document name and the correct number of permission pages are not inputted, a message showing that the permission document name or the number of permission pages is incorrect is displayed to the display apparatus 51.

Subsequently, whether or not the delete button 64 has been clicked is discriminated. If it has been clicked, whether or not the permission document name has been selected in the document name display column 62 is discriminated. If it has been selected, the selected permission document name is deleted from the document name display column 62 and the corresponding number of permission pages is deleted from the page number display column 67. If the permission document name is not selected, a message showing that the permission document name is not selected is displayed to the display apparatus 51.

Subsequently, whether or not the end button 65 has been clicked is discriminated. If it has been clicked, the information in the document name display column 62 and the page number display column 67 is stored in the document name limit information table 53a, the setting display screen 60 is closed, and the process is finished.

The flowchart will now be described.

Step S41: The setting display screen 60 is displayed to the display apparatus 51.

Step S42: The document name limit information table 53a is obtained.

Step S43: The document name limit information table 53a is displayed to the document name display column 62 and the page number display column 67.

Step S44: Whether or not there is an input from the input apparatus 52 is discriminated. If there is the input from the input apparatus 52, step S45 follows. If there is no input from the input apparatus 52, the system enters the standby mode.

Step S45: The display of the setting display screen 60 is changed in accordance with the input.

Step S46: Whether or not the add button 63 has been clicked is discriminated. If the add button 63 has been clicked, step S47 follows. If the add button 63 is not clicked, step S50 follows.

Step S47: Whether or not the correct permission document name has been inputted to the document name input column 61 and the correct number of permission pages has been inputted to the page number input column 66 is discriminated. If the correct permission document name has been inputted to the document name input column 61 and the correct number of permission pages has been inputted to the page number input column 66, step S48 follows. If the correct permission document name is not inputted to the document name input column 61 and the correct number of permission pages is not inputted to the page number input column 66, step S49 follows.

Step S48: The permission document name in the document name input column 61 is added to the document name display column 62 and the number of permission pages in the page number input column 66 is added to the page number display column 67.

Step S49: A message showing that the permission document name or the number of permission pages is incorrect is displayed to the display apparatus 51.

Step S50: Whether or not the delete button 64 has been clicked is discriminated. If the delete button 64 has been clicked, step S51 follows. If the delete button 64 is not clicked, step S54 follows.

Step S51: Whether or not the permission document name has been selected in the document name display column 62 is discriminated. If the permission document name has been selected in the document name display column 62, step S52 follows. If the permission document name is not selected in the document name display column 62, step S53 follows.

Step S52: The selected permission document name is deleted from the document name display column 62 and the corresponding number of permission pages is deleted from the page number display column 67.

Step S53: A message showing that the permission document name is not selected is displayed to the display apparatus 51.

Step S54: Whether or not the end button 65 has been clicked is discriminated. If the end button 65 has been clicked, step S55 follows. If the end button 65 is not clicked, the processing routine is returned to step S44.

Step S55: The information in the document name display column 62 and the page number display column 67 is held in the document name limit information table 53*a*.

Step S56: The setting display screen 60 is closed and the process is finished.

The operation in the case where the printing has been instructed will now be described.

Figure 9:
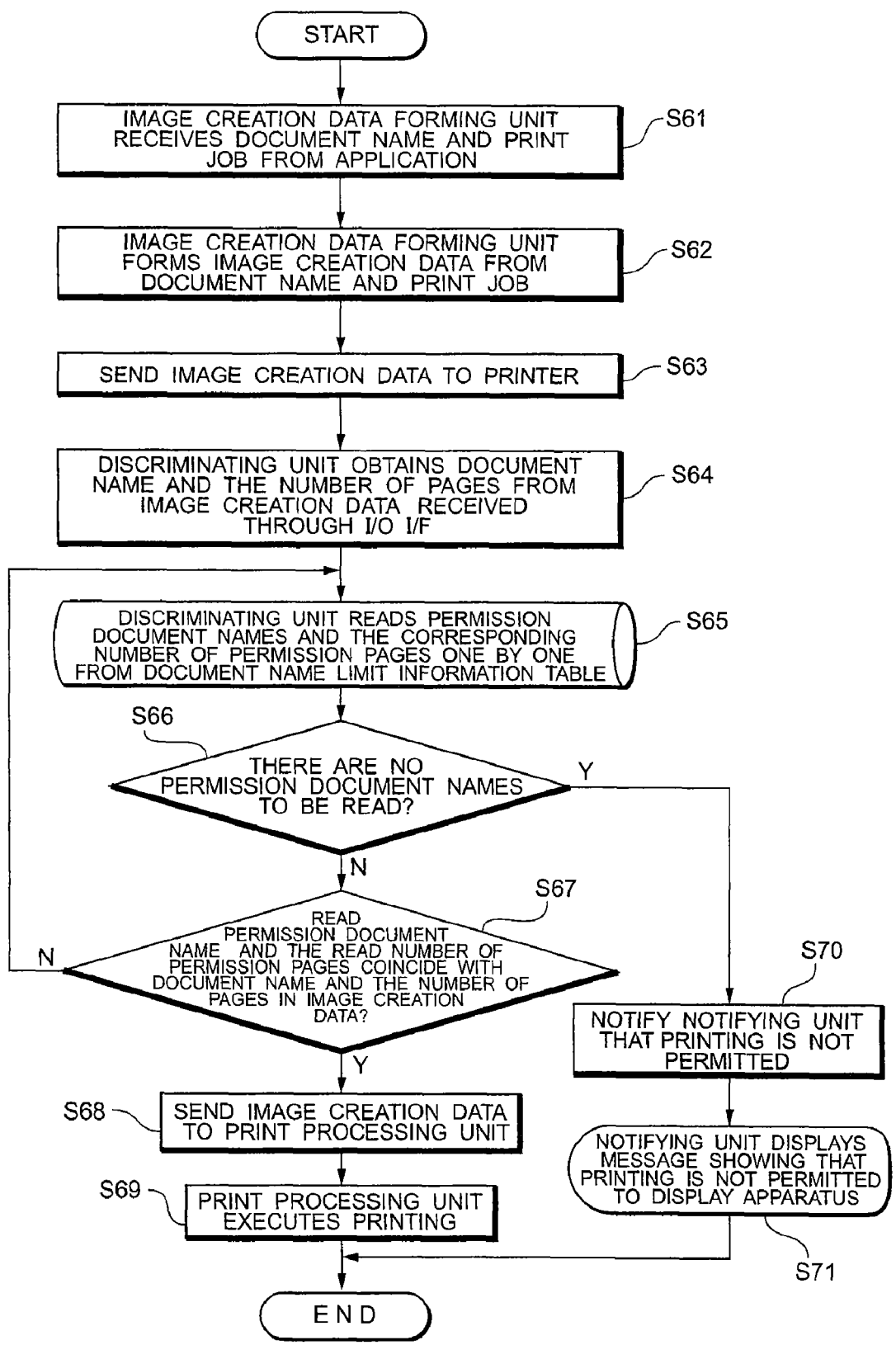
FIG. 9 is a flowchart showing the operation of the image forming system in the second embodiment of the invention.

FIG. 9 is a flowchart showing the operation of the image forming system in the second embodiment of the invention.

The operation in the case where the printing of the document opened by the application 21 in the client apparatus 20 has been instructed will now be described.

First, when the printing is instructed from the application 21, the document name and the print job are sent to the image creation data forming unit 22*a* from the application 21. The image creation data forming unit 22*a* forms the image creation data including the document name from the received document name and print job and sends it to the printer 50.

Subsequently, the discriminating unit 54*b* obtains the document name and the number of pages from the image creation data received through the I/O interface 55 and reads the permission document names and the corresponding number of permission pages one by one from the document name limit information table 53*a*. The presence or absence of the permission document names to be read out is discriminated. If there are no permission document names to be read out, the notifying unit 54*d* is notified that the printing is not permitted. The notifying unit 54*d* allows the display apparatus 51 to display a message showing that the printing is not permitted, and the process is finished.

If the permission document names to be read out exist, whether or not the document name and the number of pages in the image creation data coincide with the read-out permission document name and the read-out number of permission pages is discriminated. If they coincide, the image creation data is sent to the print processing unit 54*c*. Thus, the print processing unit 54*c* executes the printing on the basis of the received image creation data, and the process is finished.

The flowchart will now be described.

Step S61 The image creation data forming unit 22*a* receives the document name and the print job from the application 21.

Step S62: The image creation data forming unit 22*a* forms the image creation data from the document name and the print job.

Step S63: The image creation data is sent to the printer 50.

Step S64: The discriminating unit 54*b* obtains the document name and the number of pages from the image creation data received through the I/O interface 55.

Step S65: The discriminating unit 54*b* reads the permission document names and the corresponding number of permission pages one by one from the document name limit information table 53*a*.

Step S66: The presence or absence of the permission document names to be read out is discriminated. If there are no permission document names to be read out, step S70 follows. If the permission document names to be read out exist, step S67 follows.

Step S67: Whether or not the read-out permission document name and the read-out number of permission pages coincide with the document name and the number of pages in the image creation data is discriminated. If the read-out permission document name and the read-out number of permission pages coincide with the document name and the number of pages in the image creation data, step S68 follows. If the read-out permission document name and the read-out number of permission pages do not coincide with the document name and the number of pages in the image creation data, the processing routine is returned to step S65.

Step S68: The image creation data is sent to the print processing unit 54*c*.

Step S69: The print processing unit 54*c* executes the printing, and the process is finished.

Step S70: The notifying unit 54*d* is notified that the printing is not permitted.

Step S71: The notifying unit 54*d* allows the display apparatus 51 to display the message showing that the printing is not permitted, and the process is finished.

Although the embodiment has been described with respect to the example in which the client apparatus 20 and the printer 50 are connected through the network 10, that is, they are network-connected, the client apparatus 20 and the printer 50 can be also connected in parallel or connected by the USB. Although the embodiment has been described with respect to the example in which the hard disk 53 is used as a storing unit, a flash memory may be used as a storing unit. Although the embodiment has been described with respect to the example in which one client apparatus 20 is used, a plurality of client apparatuses 20 may be used. Further, although the embodiment has been described with respect to the example in which one printer 50 is used, a plurality of printers 50 may be used. Although the embodiment has been described with respect to the example in which the input apparatus 52, display apparatus 51, setting unit 54a, and notifying unit 54d are provided for the printer 50, the input apparatus 52, display apparatus 51, setting unit 54a, and notifying unit 54d can be also provided for the client apparatus 20. Although the embodiment has been described with respect to the example in which the first image creation information and the second image creation information are the number of pages, each of the first image creation information and the second image creation information may be a sheet size, a sheet type, or a combination of them. Although the embodiment has been described with respect to the example in which the printing is permitted when the number of pages coincides, the printing can be also permitted when the number of pages is equal to or less than the number of permission pages.

In the embodiment as mentioned above, the permission document name to permit the printing is set. Therefore, it is possible to permit the printing of the image creation data in which the permission document name has been set and to inhibit the printing of the image creation data of other document names. Since the number of pages of the document is set, it is possible to inhibit the printing of other documents to which the same number of pages has been allocated.

Embodiment 3

The third embodiment of the invention will now be described. The component elements having the same or similar constructions as those in the first and second embodiments are designated by the same reference numerals and their description is omitted. Explanation of substantially the same operations and effects as those in the first and second embodiments is also omitted.

Figure 10:
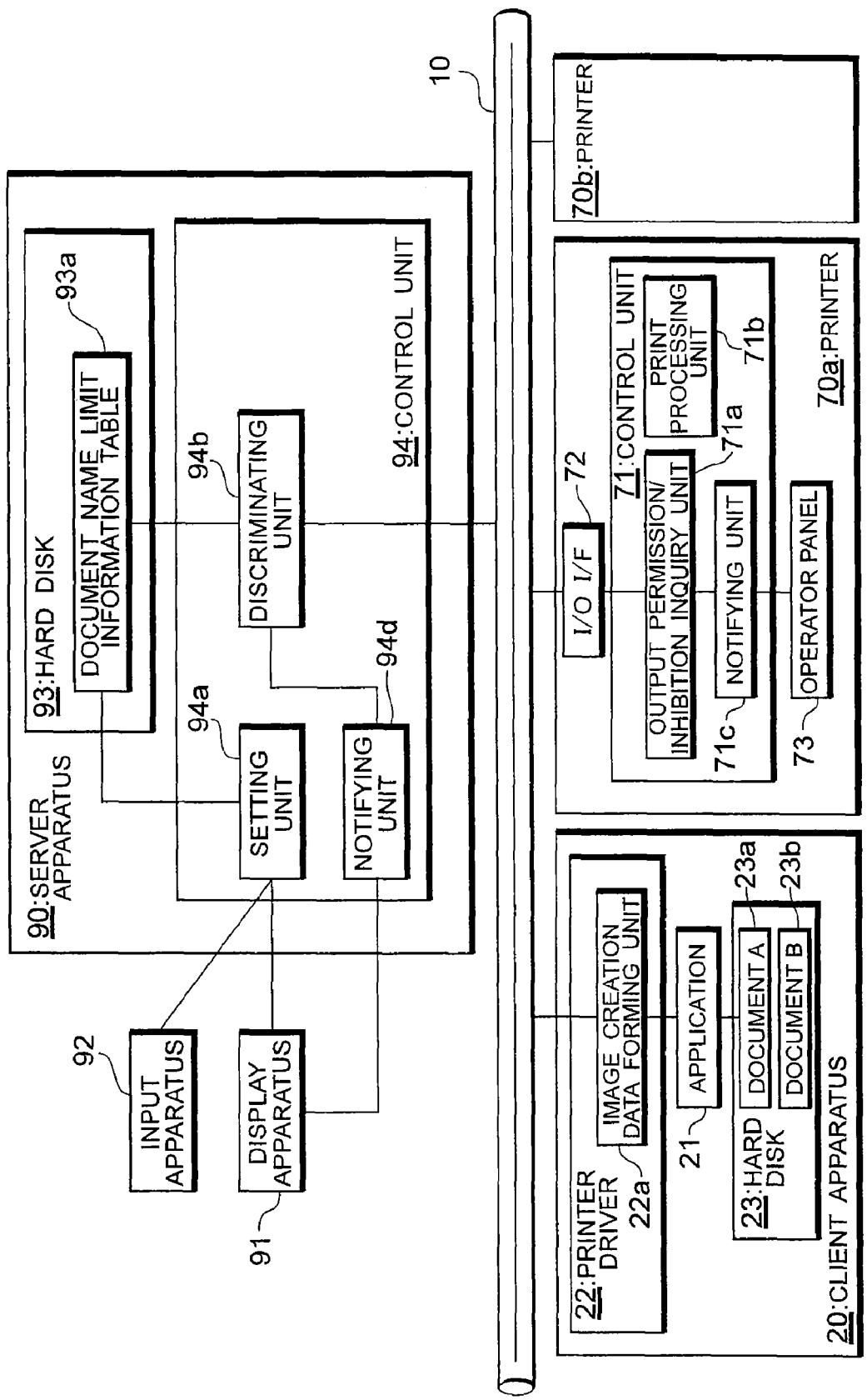
FIG. 10 is a block diagram showing a construction of an image forming system in the third embodiment of the invention.

FIG. 10 is a block diagram showing a construction of an image forming system in the third embodiment of the invention.

As shown in FIG. 10, the image forming system of the third embodiment is set in such an environment that the client apparatus 20 as an image processing apparatus, printers 70a and 70b as image forming apparatuses, and a server apparatus 90 are connected through the network 10 and they can communicate with each other.

In the embodiment, the printers 70a and 70b are apparatuses which form images onto the recording paper on the basis of the received image creation data and execute the printing. Since the printers 70a and 70b have substantially the same construction, they will be explained integratedly as a printer 70.

The printer 70 has: a control unit 71; an input/output interface (I/O interface) 72 as an input unit; and an operator panel 73. The control unit 71 has an output permission/inhibition inquiry unit 71a, a print processing unit 71b, and a notifying unit 71c. The output permission/inhibition inquiry unit 71a obtains the document name as a first document identifier and the number of pages as first image creation information from the image creation data sent from the client apparatus 20, sends the document name and the number of pages to the server apparatus 90, and inquires of the server apparatus 90 about the permission of the printing. If a fact that the printing is permitted is notified from the server apparatus 90, the output permission/inhibition inquiry unit 71a sends the image creation data to the print processing unit 71b. If a fact that the printing is not permitted is notified, the inquiry unit 71a notifies the notifying unit 71c that the printing is not permitted. Further, the print processing unit 71b executes the printing on the basis of the image creation data sent from the output permission/inhibition inquiry unit 71a, and the process is finished. Further, if a fact that the printing is not permitted is notified from the output permission/inhibition inquiry unit 71a, the notifying unit 71c displays a message showing that the printing is not permitted to the operator panel 73.

The I/O interface 72 inquires about the permission of the reception or printing of the image creation data through the network 10. Further, the operator panel 73 displays the message.

A display apparatus 91 such as CRT, LCD, or the like for displaying and an input apparatus 92 having a keyboard, a mouse, and the like for inputting information from the outside are connected to the server apparatus 90. The server apparatus 90 also has a hard disk 93 as a storing unit and a control unit 94.

The hard disk 93 has a document name limit information table 93a. A permission document name as a second document identifier to permit the printing and the number of permission pages (as second image creation information) of the document are stored in the document name limit information table 93a. The wild card "*" indicative of an arbitrary character train can be used as a permission document name.

The control unit 94 has a setting unit 94a, a discriminating unit 94b, and a notifying unit 94d. The setting unit 94a allows the display apparatus 91 to display the setting display screen 60 for inputting the permission document name and the number of permission pages. On the basis of the information inputted from the input apparatus 92, the setting unit 94a stores the permission document name and the number of permission pages into the document name limit information table 93a.

If the document name and the number of pages sent from the printer 70 coincide with the permission document name and the number of permission pages in the document name limit information table 93a, the discriminating unit 94b determines that the printing is permitted, and notifies the printer 70 that the printing is permitted. In the other cases, the discriminating unit 94b determines that the printing is not permitted, and notifies the printer 70 that the printing is not permitted. If the wild card "*" indicative of the arbitrary character train is used for the permission document name, the discriminating unit 94b discriminates about the coincidence or dissidence in consideration of the wild card. For example, in the case of the permission document name "document A*", it is determined that the document names of "document A", "document A1", and "document ABC" coincide with the permission document name and it is determined that the document name of "document B" does not coincide with the permission document name.

The operation of the image forming system in the embodiment will now be described. First, the operation to set the document name limit information table 93a by the server apparatus 90 will be described.

Since display examples of the setting display screen 60 and flowcharts showing the operation of the setting unit of the printer 70 in the third embodiment are similar to those in the second embodiment, they are not shown and will be explained hereinbelow with reference to FIGS. 7 and 8 mentioned above.

First, the setting unit 94a allows the display apparatus 91 to display the setting display screen 60, reads the document name limit information table 93a, and displays it to the document name display column 62 and the page number display column 67. Subsequently, whether or not there is an input from the input apparatus 92 is discriminated. If there is the input, the display contents are changed on the basis of the input.

Subsequently, whether or not the add button 63 has been clicked is discriminated. If it has been clicked, whether or not the correct permission document name has been inputted to the document name input column 61 and the correct number of permission pages has been inputted into the page number input column 66 is discriminated. If they have been inputted, the permission document name in the document name input column 61 is added to the document name display column 62 and displayed and the number of permission pages in the page number input column 66 is added to the page number display column 67 and displayed. If the correct permission document name and the correct number of permission pages are not inputted, the message showing that the permission document name or the number of permission pages is incorrect is displayed to the display apparatus 91.

Subsequently, whether or not the delete button 64 has been clicked is discriminated. If it has been clicked, whether or not the permission document name has been selected in the document name display column 62 is discriminated. If it has been selected, the selected permission document name is deleted from the document name display column 62 and the corresponding number of permission pages is deleted from the page number display column 67. If the permission document name is not selected, the message showing that the permission document name is not selected is displayed to the display apparatus 91.

Subsequently, whether or not the end button 65 has been clicked is discriminated. If it has been clicked, the information in the document name display column 62 and the page number display column 67 is stored in the document name limit information table 93a, the setting display screen 60 is closed, and the process is finished.

The operation in the case where the printing has been instructed will now be described.

Figure 11:
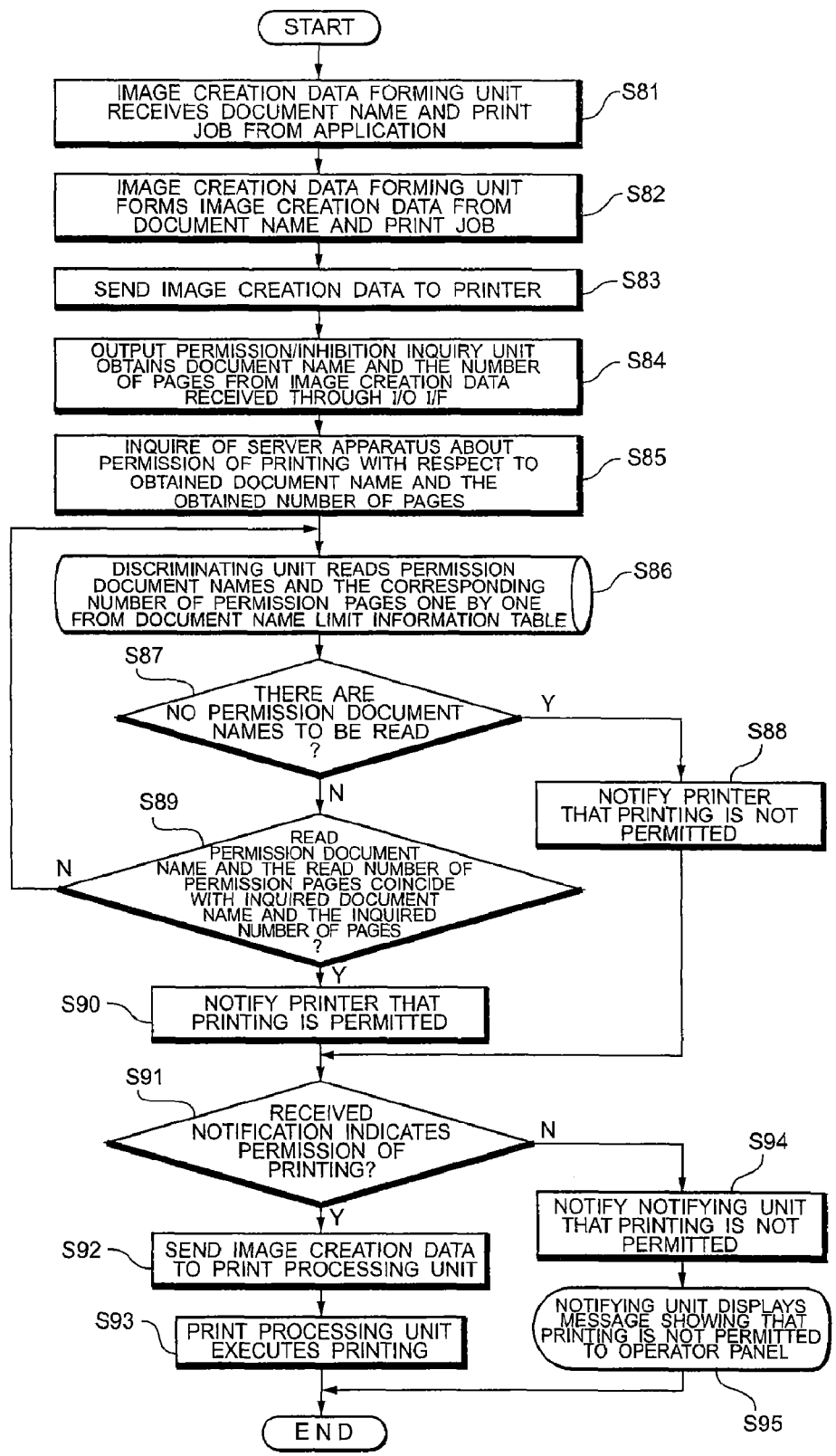
FIG. 11 is a flowchart showing the operation of the image forming system in the third embodiment of the invention.

FIG. 11 is a flowchart showing the operation of the image forming system in the third embodiment of the invention.

The operation in the case where the printing of the document opened by the application 21 in the client apparatus 20 has been instructed will now be described.

First, when the printing is instructed from the application 21, the document name and the print job are sent to the image creation data forming unit 22a from the application 21. The image creation data forming unit 22a forms the image creation data including the document name from the received document name and print job and sends it to the printer 70.

Subsequently, the output permission/inhibition inquiry unit 71a obtains the document name and the number of pages from the image creation data received through the I/O interface 72 and inquires of the server apparatus 90 through the I/O interface 72 about whether or not the printing is permitted with respect to the document name and the number of pages which were obtained.

The discriminating unit 94b reads the permission document names and the corresponding number of permission pages one by one from the document name limit information table 93a. The presence or absence of the permission document names to be read out is discriminated. If there are no permission document names to be read out, the printer 70 is notified that the printing is not permitted. If the permission document names to be read out exist, whether or not the inquired document name and the inputted number of pages coincide with the read-out permission document names and the read-out number of permission pages is discriminated. If they coincide, the printer 70 is notified that the printing is permitted.

The output permission/inhibition inquiry unit 71a discriminates whether or not the notification received through the I/O interface 72 indicates the permission of the printing. If it indicates the permission of the printing, the output permission/inhibition inquiry unit 71a sends the image creation data to the print processing unit 71b. Thus, the print processing unit 71b executes the printing on the basis of the received image creation data, and the process is finished. If the notification indicates that the printing is not permitted, the inquiry unit 71a notifies the notifying unit 71c that the printing is not permitted. Thus, the notifying unit 71c displays a message showing that the printing is not permitted to the operator panel 73, and the process is finished.

The flowchart will now be described.

Step S81: The image creation data forming unit 22a receives the document name and the print job from the application 21.

Step S82: The image creation data forming unit 22a forms the image creation data from the document name and the print job.

Step S83: The image creation data is sent to the printer 70.

Step S84: The output permission/inhibition inquiry unit 71a obtains the document name and the number of pages from the image creation data received through the I/O interface 72.

Step S85: The output permission/inhibition inquiry unit 71a inquires of the server apparatus 90 about whether or not the printing is permitted with respect to the obtained document name and the obtained number of pages.

Step S86: The discriminating unit 94b reads the permission document names and the corresponding number of permission pages one by one from the document name limit information table 93a.

Step S87: The presence or absence of the permission document names to be read out is discriminated. If there are no permission document names to be read out, step S88 follows. If the permission document names to be read out exist, step S89 follows.

Step S88: The printer 70 is notified that the printing is not permitted.

Step S89: Whether or not the read-out permission document name and the read-out number of permission pages coincide with the inquired document name and the inquired number of pages is discriminated. If the read-out permission document name and the read-out number of permission pages coincide with the inquired document name and inquired number of pages, step S90 follows. If the read-out permission document name and the read-out number of permission pages do not coincide with the inquired document name and the inquired number of pages, the processing routine is returned to step S86.

Step S90: The printer 70 is notified that the printing is permitted.

Step S91: Whether or not the received notification indicates the permission of the printing is discriminated. If the received notification indicates the permission of the printing, step S92 follows. If the received notification indicates that the printing is not permitted, step S94 follows.

Step S92: The image creation data is sent to the print processing unit 71b.

Step S93: The print processing unit 71b executes the printing, and the process is finished.

Step S94: The notifying unit 71c is notified that the printing is not permitted.

Step S95: The notifying unit 71c allows the display panel 73 to display the message showing that the printing is not permitted, and the process is finished.

Although the embodiment has been described with respect to the example in which the client apparatus 20, printer 70, and server apparatus 90 are connected through the network 10, that is, they are network-connected, the client apparatus 20, printer 70, and server apparatus 90 can be also connected in parallel or connected by the USB. Although the embodiment has been described with respect to the example in which the hard disk 93 is used as a storing unit, a flash memory may be used as a storing unit. Although the embodiment has been described with respect to the example in which one client apparatus 20 is used, a plurality of client apparatuses 20 may be used. Further, although the embodiment has been described with respect to the example in which the first image creation information and the second image creation information are the number of pages, each of the first image creation information and the second image creation information may be the sheet size, sheet type, or combination of them. Although the embodiment has been described with respect to the example in which the printing is permitted when the number of pages coincides, the printing can be also permitted when the number of pages is equal to or less than the number of permission pages. Further, although the embodiment has been described with respect to the example in which the printer 70 is constructed by the two printers 70a and 70b, the number of printers 70 may be set to 1 or 3 or more.

As mentioned above, in the embodiment, by setting the permission document name which permits the printing, it is possible to permit the printing of the document of the set permission document name and to inhibit the printing of the documents of other document names. By setting the number of pages of the document, the printing of other documents to which the same document name has been allocated can be inhibited. Moreover, by providing the hard disk 93 as a storing unit for the server apparatus 90, in an environment in which a plurality of printers 70 exist, even if the same setting is made to all of the printers 70, by making the setting to the server apparatus, the setting contents are validated in all of the printers 70.

Embodiment 4

The fourth embodiment of the invention will now be described. The component elements having the same or similar constructions as those in the first to third embodiments are designated by the same reference numerals and their description is omitted. Explanation of substantially the same operations and effects as those in the first to third embodiments is also omitted.

Figure 12:
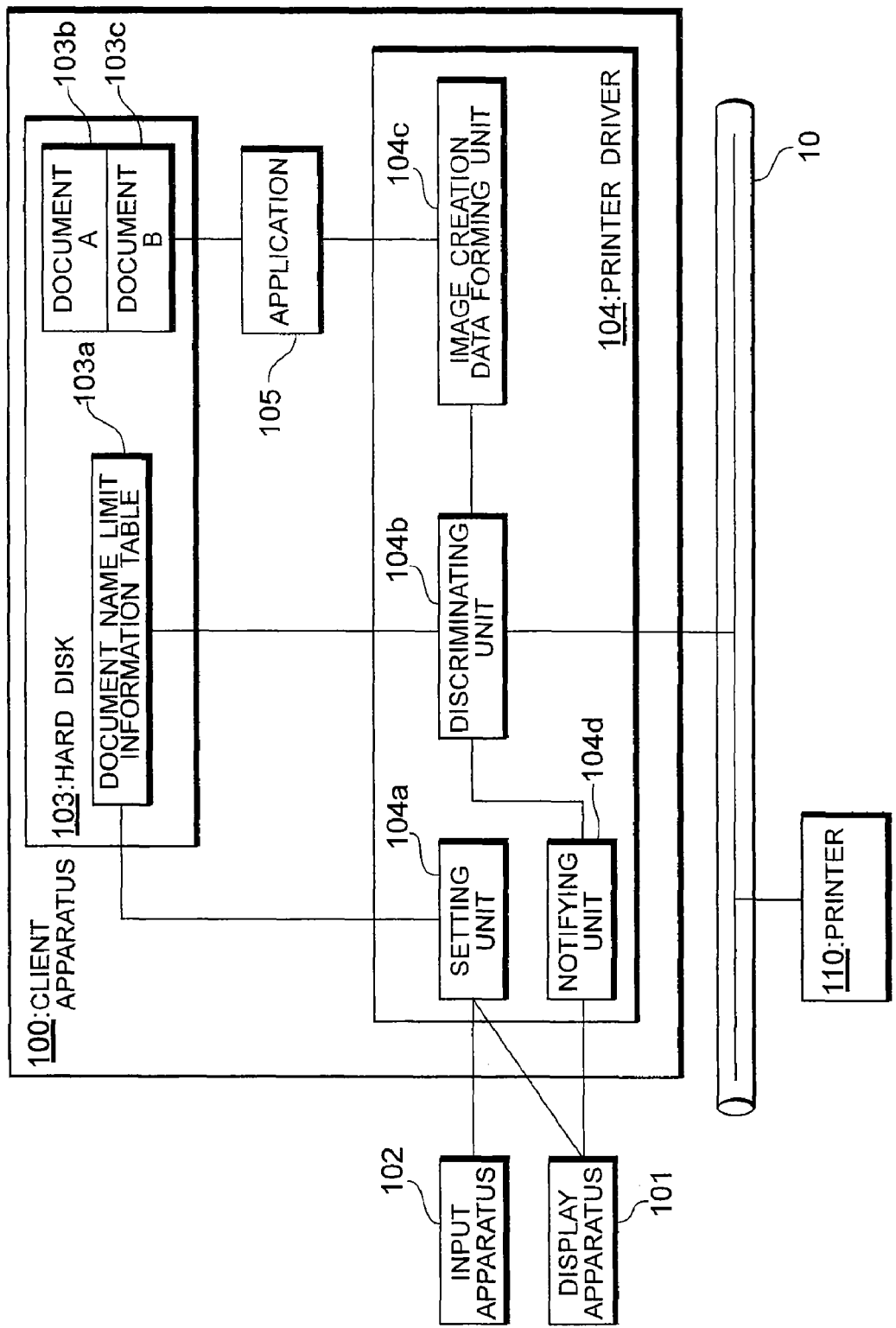
FIG. 12 is a block diagram showing a construction of an image forming system in the fourth embodiment of the invention.

FIG. 12 is a block diagram showing a construction of an image forming system in the fourth embodiment of the invention.

As shown in FIG. 12, the image forming system of the fourth embodiment is set in such an environment that a client apparatus 100 as an image processing apparatus and a printer 110 as an image forming apparatus are connected through the network 10 and they can communicate with each other.

The client apparatus 100 sends the image creation data including the document name as a first document identifier and the number of pages as first image creation information to the printer 110. A display apparatus 101 such as CRT, LCD, or the like for displaying and an input apparatus 102 having a keyboard, a mouse, and the like for inputting information from the outside are connected to the client apparatus 100. The client apparatus 100 also has: a hard disk 103 as a storing unit, a printer driver 104, and an application 105.

The hard disk 103 has a document name limit information table 103a, a document A 103b, and a document B 103c. A permission document name as a second document identifier to permit the printing and the number of permission pages (as second image creation information) to permit the printing of the document are stored in the document name limit information table 103a. The document A 103b and the document B 103c are the documents formed by the application 105.

The application 105 is general software for executing the creation, printing, or the like of a document. When the document A 103b and the document B 103c stored in the hard disk 103 are opened and the printing is instructed, the application 105 sends the document name and the print job to the printer driver 104.

The printer driver 104 has a setting unit 104a, a discriminating unit 104b, an image creation data forming unit 104c, and a notifying unit 104d.

The setting unit 104a allows the display apparatus 101 to display the setting display screen 60 for inputting the permission document name as a second document identifier and the number of permission pages as second image creation information. On the basis of the information inputted from the input apparatus 102, the setting unit 104a stores the permission document name and the number of permission pages into the document name limit information table 103a.

The discriminating unit 104b obtains the document name and the number of pages from the image creation data received from the image creation data forming unit 104c. If the obtained document name and the obtained number of pages coincide with the permission document name and the number of permission pages in the document name limit information table 103a, the discriminating unit 104b determines that the printing is permitted, and sends the image creation data to the printer 110. In the other cases, the discriminating unit 104b determines that the printing is not permitted, and notifies the notifying unit 104d that the printing is not permitted. If the wild card "*" indicative of the arbitrary character train is used for the permission document name, the discriminating unit 104b discriminates about the coincidence or dissidence in consideration of the wild card. For example, in the case of the permission document name "document A*", it is determined that the document names of "document A", "document A1", and "document ABC" coincide with the permission document name and it is determined that the document name of "document B" does not coincide with the permission document name.

On the basis of the document name and the print job received from the application 105, the image creation data forming unit 104c forms the image creation data including the document name for allowing the printer 110 to print and sends it to the discriminating unit 104b. If a fact that the printing is not permitted is notified from the discriminating unit 104b, the notifying unit 104d allows the display apparatus 101 to display a message showing that the printing is not permitted.

The printer 110 prints images onto the recording paper on the basis of the image creation data received from the client apparatus 100.

The operation of the image forming system in the embodiment will now be described. First, the operation to set the document name limit information table 103a by the client apparatus 100 will now be described.

Since display examples of the setting display screen 60 and flowcharts showing the operation of the setting unit of the printer 110 in the fourth embodiment are similar to those in the second embodiment, they are not shown and will be explained hereinbelow with reference to FIGS. 7 and 8 mentioned above.

First, the setting unit 104a allows the display apparatus 101 to display the setting display screen 60, reads the document name limit information table 103a, and displays it to the document name display column 62 and the page number display column 67. Subsequently, whether or not there is an input from the input apparatus 102 is discriminated. If there is the input, the display contents are changed on the basis of the input.

Subsequently, whether or not the add button 63 has been clicked is discriminated. If it has been clicked, whether or not the correct permission document name has been inputted to the document name input column 61 and the correct number of permission pages has been inputted into the page number input column 66 is discriminated. If they have been inputted, the permission document name in the document name input column 61 is added to the document name display column 62 and displayed and the number of permission pages in page number input column 66 is added to the page number display column 67 and displayed. If the correct permission document name and the correct number of permission pages are not inputted, the message showing that the permission document name or the number of permission pages is incorrect is displayed to the display apparatus 101.

Subsequently, whether or not the delete button 64 has been clicked is discriminated. If it has been clicked, whether or not the permission document name has been selected in the document name display column 62 is discriminated. If it has been selected, the selected permission document name is deleted from the document name display column 62 and the corresponding number of permission pages is deleted from the page number display column 67. If the permission document name is not selected, the message showing that the permission document name is not selected is displayed to the display apparatus 101.

Subsequently, whether or not the end button 65 has been clicked is discriminated. If it has been clicked, the information in the document name display column 62 and the page number display column 67 is stored in the document name limit information table 103*a*, the setting display screen 60 is closed, and the process is finished.

The operation in the case where the printing has been instructed will now be described.

Figure 13:
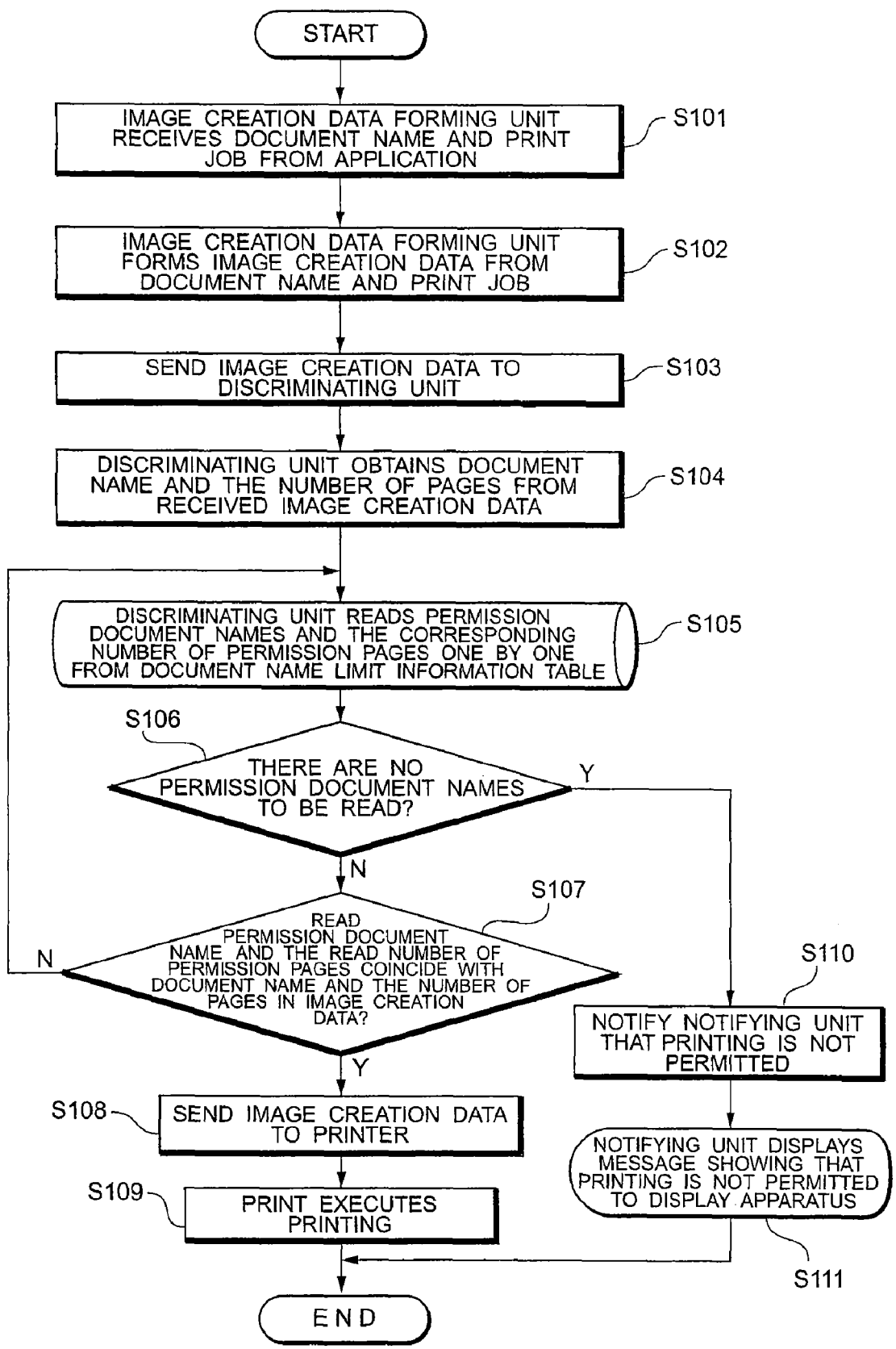
FIG. 13 is a flowchart showing the operation of the image forming system in the fourth embodiment of the invention.

FIG. 13 is a flowchart showing the operation of the image forming system in the fourth embodiment of the invention.

The operation in the case where the printing of the document opened by the application 105 in the client apparatus 100 has been instructed will now be described.

First, when the printing is instructed from the application 105, the document name and the print job are sent to the image creation data forming unit 104*c* from the application 105. The image creation data forming unit 104*c* forms the image creation data from the received document name and print job and sends it to the discriminating unit 104*b*.

Subsequently, the discriminating unit 104*b* obtains the document name and the number of pages from the received image creation data and reads the permission document names and the corresponding number of permission pages one by one from the document name limit information table 103*a*. The presence or absence of the permission document names to be read out is discriminated. If there are no permission document names to be read out, the notifying unit 104*d* is notified that the printing is not permitted. Thus, the notifying unit 104*d* allows the display apparatus 101 to display the message showing that the printing is not permitted, and the process is finished.

If the permission document names to be read out exist, whether or not the document name and the number of pages in the image creation data coincide with the read-out permission document names and the read-out number of permission pages is discriminated. If they coincide, the image creation data is sent to the printer 110. Thus, the printer 110 executes the printing on the basis of the received image creation data, and the process is finished.

The flowchart will now be described.

Step S101: The image creation data forming unit 104*c* receives the document name and the print job from the application 105.

Step S102: The image creation data forming unit 104*c* forms the image creation data from the document name and the print job.

Step S103: The image creation data is sent to the discriminating unit 104*b*.

Step S104: The discriminating unit 104*b* obtains the document name and the number of pages from the received image creation data.

Step S105: The discriminating unit 104*b* reads the permission document names and the corresponding number of permission pages one by one from the document name limit information table 103*a*.

Step S106: The presence or absence of the permission document names to be read out is discriminated. If there are no permission document names to be read out, step S110 follows. If the permission document names to be read out exist, step S107 follows.

Step S107: Whether or not the read-out permission document name and the read-out number of permission pages coincide with the document name and the number of pages in the image creation data is discriminated. If the read-out permission document name and the read-out number of permission pages coincide with the document name and the number of pages in the image creation data, step S108 follows. If the read-out permission document name and the read-out number of permission pages do not coincide with the document name and the number of pages in the image creation data, the processing routine is returned to step S105.

Step S108: The image creation data is sent to the printer 110.

Step S109: The printer 110 executes the printing, and the process is finished.

Step S110: The notifying unit 104*d* is notified that the printing is not permitted.

Step S111: The notifying unit 104*d* allows the display apparatus 101 to display the message showing that the printing is not permitted, and the process is finished.

Although the embodiment has been described with respect to the example in which the client apparatus 100 and the printer 110 are connected through the network 10, that is, they are network-connected, the client apparatus 100 and the printer 110 can be also connected in parallel or connected by the USB. Although the embodiment has been described with respect to the example in which the hard disk 103 is used as a storing unit, a flash memory may be used as a storing unit. Although the embodiment has been described with respect to the example in which one client apparatus 100 is used, a plurality of client apparatuses 100 may be used. Further, although the embodiment has been described with respect to the example in which one printer 110 is used, a plurality of printers 110 may be used. Moreover, although the embodiment has been described with respect to the example in which the first image creation information and the second image creation information are the number of pages, each of the first image creation information and the second image creation information may be the sheet size, sheet type, or combination of them. Although the embodiment has been described with respect to the example in which the printing is permitted when the number of pages coincides, the printing can be also permitted when the number of pages is equal to or less than the number of permission pages.

As mentioned above, in the embodiment, the permission document name which permits the printing is set. Therefore, it is possible to permit the printing of the document of the set permission document name and to inhibit the printing of the documents of other document names. Since the number of pages of the document is set, the printing of other documents to which the same document name has been allocated can be inhibited. Moreover, since the unit to set the permission document name which permits the printing and the unit to set the number of pages of the document are provided for the client apparatus 100, the permission document name which permits the printing or the number of pages of the document can be set without changing the printer 110 side.

Although the first to fourth embodiments have been described with respect to the example in which the image forming apparatus is the printer, the image forming apparatus may be a copying apparatus or an MFP (Multi Function Printer).

The invention is not limited to the foregoing embodiments but many modifications and variations are possible on the basis of the spirit of the invention and are not excluded from the purview of the invention.

Embodiment 5

Construction of the Embodiment 5

Figure 14:
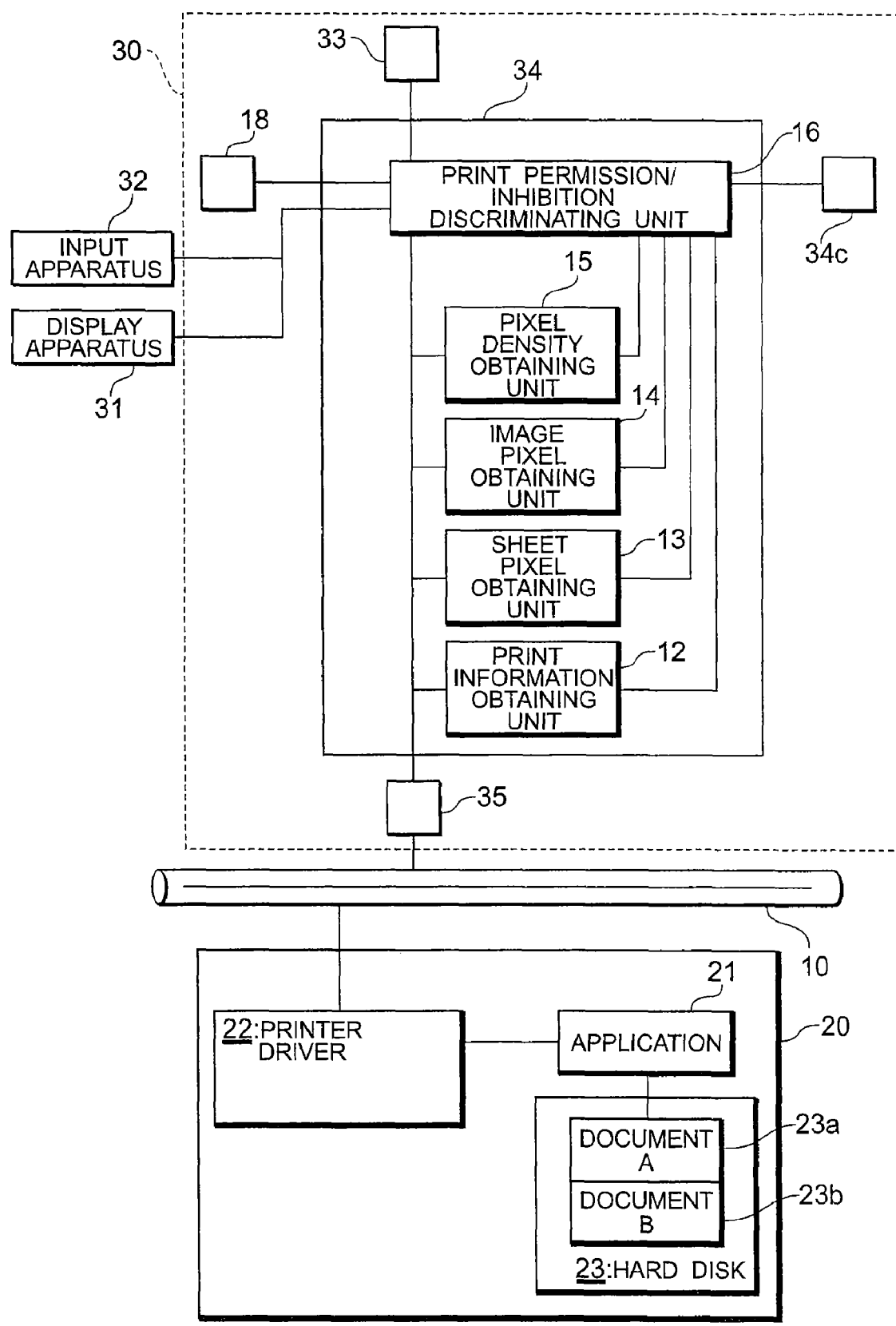
FIG. 14 is a block constructional diagram showing an image forming apparatus of the invention.

FIG. 14 is a block constructional diagram showing an image forming apparatus of the invention.

As shown in FIG. 14, the image forming apparatus 30 as a printer according to the invention has: the control unit 34; the storing unit 33; a print information obtaining unit 12; a sheet pixel obtaining unit 13; an image pixel obtaining unit 14; a pixel density obtaining unit 15; a print permission/inhibition discriminating unit 16; the print processing unit 34c; and a notifying unit 18. The image forming apparatus 30 is connected to the client apparatus 20 as an upper apparatus through a network.

The storing unit 33 is a memory in which pixel limit density information and discrimination control information have been stored. As shown in FIG. 15, the pixel limit density information is information showing a pixel density of each of the colors of cyan, magenta, yellow, and black and a total pixel density of the colors and is used as limit reference values of the high-density printing. As shown in FIG. 16, the discrimination control information is information to discriminate which one of the pixel density of each of the colors of cyan, magenta, yellow, and black and the total pixel density of the colors is included in discrimination targets for the print limit. When the discrimination control information is set to "1", such a pixel density is included in the discrimination targets for the print limit. When the discrimination control information is set to "0", such a pixel density is not included in the discrimination targets for the print limit. In the embodiment, since "1" has been set for the pixel density of each color and for the total pixel density of the colors, the pixel densities of all of the colors and the total pixel density are included in the discrimination targets for the print limit. The pixel limit density information and the discrimination control information can be previously set by commands from the client apparatus 20 or may be set by an operation panel (not shown) of the image forming apparatus 30.

A workstation, a PC, or the like is used as a client apparatus 20. When the printing is instructed from the user through the input unit (not shown), the client apparatus 20 makes the printer driver 22 in the memory operative so as to form print attribute information comprising: vertical dimension data showing a vertical dimension of the recording paper to which the printing has been instructed by the user; lateral dimension data showing a lateral dimension of the recording paper; and image resolution data showing an image resolution. The client apparatus 20 sends print information including the formed print attribute information and the print data to the image forming apparatus 30 through the interface 35. In the embodiment, it is assumed that the print attribute information comprising the recording paper vertical dimension of "11 inches", the recording paper lateral dimension of "2 inches", and the image resolution of "300 dots/inch (dots per inch; also simply referred to as dpi hereinbelow)" is formed. The data showing a size of recording paper is not limited to the vertical/lateral dimensions but, for example, it is also possible to form the print attribute information comprising: data showing the recording paper size such as "A4", "A5", "B4", or the like; and the image resolution data showing the image resolution. In this case, it is preferable that the vertical/lateral dimensions corresponding to the recording paper size are held on the image forming apparatus 30 side.

The control unit 34 of the image forming apparatus 30 is a control unit which functions as so called a CPU and integratedly controls the image forming apparatus 30. When the print information is received from the client apparatus 20, the control unit 34 transfers the print information to the print information obtaining unit 12.

The print information obtaining unit 12 is an obtaining unit for obtaining the print attribute information from the print information. When the print information is received, the print information obtaining unit 12 analyzes the print information and separates the print data and the print attribute information therefrom, thereby obtaining the print attribute information. In the embodiment, it is assumed that the print attribute information comprising the recording paper vertical dimension of "11 inches", the recording paper lateral dimension of "2 inches", the image resolution of "300 dpi", and print color designation data indicative of either a color image or a monochromatic image is obtained.

When the print information obtaining unit 12 obtains the print attribute information, the control unit 34 forms image data from the print data on the basis of the print attribute information, holds it into the memory (not shown), and transfers the print attribute information to the sheet pixel obtaining unit 13.

The sheet pixel obtaining unit 13 is an obtaining unit for obtaining sheet pixel information showing the maximum number of pixels which can be recorded onto the recording paper and the following sheet pixel calculating equation has been held in the memory (not shown).

$$\text{Sheet pixel calculating equation} = (PT \times PY) \times G \qquad (1)$$

where,
PT: recording paper vertical dimension
PY: recording paper lateral dimension
G: image resolution When the print information obtaining unit 12 obtains the print attribute information, the sheet pixel obtaining unit 13 applies the recording paper vertical dimension data, recording paper lateral dimension data, image resolution data, and print color designation data included in the print attribute information to the equation (1), thereby obtaining the sheet pixel information. In this instance, the control unit 34 holds the obtained sheet pixel information into the memory (not shown).

In the embodiment, since the print attribute information comprising the recording paper vertical dimension of "11 inches", recording paper lateral dimension of "2 inches", image resolution of "300 dpi", and print color designation data indicative of either the color image or the monochromatic image is obtained, the recording paper vertical dimension of "11 inches", recording paper lateral dimension of "2 inches", and image resolution of "300 dpi" are applied to the equation (1). In the case of the monochromatic image, since one frame is used, "6600 dots" is obtained as sheet pixel information YD. In the case of the color image, since four frames are used, "26400 dots" is calculated as sheet pixel information YD.

The image pixel obtaining unit 14 is an obtaining unit for obtaining pixel number information showing the number of pixels which are used in the actual printing in the image data as a print target. When the sheet pixel obtaining unit 13 obtains the sheet pixel information YD, the image data held in the memory (not shown) is analyzed, thereby obtaining image pixel number information showing the number of pixels of each of the colors (=cyan, magenta, yellow, black) which are used in the actual printing and image pixel number information showing the total number of pixels of the colors in the image data, respectively.

In the embodiment, it is assumed that "GDc (=cyan)", "GDm (=magenta)", "GDy (=yellow)", "GDk (=black)", and "GD (=total of the respective colors)" are obtained as image pixel number information, respectively.

The pixel density obtaining unit 15 is an obtaining unit for obtaining pixel density information showing the pixel density of the image data as a print target. The following pixel density calculating equations have been held in the memory (not shown).

$$\text{Pixel density calculating equation } 1 = GD/YD \quad (2)$$

$$\text{Pixel density calculating equation } 2 = GDn/YD \quad (3)$$

where,
GDn: the number of image pixels (=any one of
GDc: the number of image pixels of cyan
GDm: the number of image pixels of magenta
GDy: the number of image pixels of yellow
GDk: the number of image pixels of black
GD: the total number of image pixels of the respective colors
YD: the number of sheet pixels (=the number of sheet pixels of one frame)

When the image pixel obtaining unit 14 obtains each of the image pixel number information, first, the pixel density obtaining unit 15 applies the sheet pixel information YD as a total of the four frames and the total image pixel number information GD of the colors to the equation (2), thereby obtaining the pixel density information for the total image pixel number information of the colors.

Subsequently, the pixel density obtaining unit 15 applies the sheet pixel information YD and the image pixel number information GDn of each color to the equation (3), thereby obtaining the pixel density information for the image pixel number information of each color.

In the embodiment, since "660 dots (=cyan)", "660 dots (=magenta)", "660 dots (=black)", "1980 dots (=yellow)", and "3960 dots (=total)" have been obtained as image pixel number information, respectively, "10% (=cyan)", "10% (=magenta)", "10% (=black)", "30% (=yellow)", and "60% (=total of the colors)" are obtained as pixel density information for the image pixel number information, respectively.

The print permission/inhibition discriminating unit 16 is a discriminating unit for discriminating the necessity of the print limit. When the pixel density obtaining unit 15 obtains the pixel density information, respectively, the print permission/inhibition discriminating unit 16 decides a discrimination control method with reference to discrimination control information in the storing unit 33. In the embodiment, since "1" has been set for each of the colors (=cyan, magenta, yellow, black) and the total of the colors, respectively, all of the pixel densities are used as discrimination targets and the permission or inhibition of the printing is discriminated.

That is, the print permission/inhibition discriminating unit 16 compares the obtained total pixel density information of the colors with the total pixel limit density information for the colors with reference to the storing unit 33. If the pixel density is larger than the pixel limit density, the print permission/inhibition discriminating unit 16 determines that the printing is not permitted.

The print processing unit 34c is a control unit to make print control in accordance with a discrimination result about the permission or inhibition of the printing. If the print permission/inhibition discriminating unit 16 determines that the printing is not permitted, the print processing unit 34c instructs a print unit (not shown) to stop the printing process.

The notifying unit 18 is a notifying unit to notify the client apparatus 20 of a print situation. When the print processing unit 34c instructs the print unit (not shown) to stop the printing process, the notifying unit 18 sends a print non-permission signal indicative of print invalidation to the client apparatus 20.

When the print non-permission signal is received, the client apparatus 20 executes a control program in the memory (not shown) and allows a display unit (not shown) to display a print invalidation display screen showing the print invalidation. Thus, the user can confirm that the printing process has been stopped since the density of the print-requested image data is high.

If the total pixel density of the colors is smaller than the pixel limit density, the print permission/inhibition discriminating unit 16 subsequently compares the pixel density information of cyan with the pixel limit density information for cyan with reference to the storing unit 33. If the pixel density is larger than the pixel limit density, the print permission/inhibition discriminating unit 16 determines that the printing is not permitted.

In a manner similar to the above, if the print permission/inhibition discriminating unit 16 determines that the printing is not permitted, the print processing unit 34c instructs the print unit (not shown) to stop the printing process, the notifying unit 18 sends the print non-permission signal to the client apparatus 20, and the print invalidation display screen is displayed to the display unit (not shown) of the client apparatus 20.

If the pixel density of cyan is smaller than the pixel limit density, the print permission/inhibition discriminating unit 16 subsequently compares the pixel density information of magenta with the pixel limit density information for magenta with reference to the storing unit 33. If the pixel density is larger than the pixel limit density, the print permission/inhibition discriminating unit 16 determines that the printing is not permitted.

In a manner similar to the above, if the print permission/inhibition discriminating unit 16 determines that the printing is not permitted, the print processing unit 34c instructs the print unit (not shown) to stop the printing process, the notifying unit 18 sends the print non-permission signal to the client apparatus 20, and the print invalidation display screen is displayed to the display unit (not shown) of the client apparatus 20.

If the pixel density of magenta is smaller than the pixel limit density, the print permission/inhibition discriminating unit 16 subsequently compares the pixel density information of yellow with the pixel limit density information for yellow with reference to the storing unit 33. If the pixel density is larger than the pixel limit density, the print permission/inhibition discriminating unit 16 determines that the printing is not permitted.

In a manner similar to the above, if the print permission/inhibition discriminating unit 16 determines that the printing is not permitted, the print processing unit 34c instructs the print unit (not shown) to stop the printing process, the notifying unit 18 sends the print non-permission signal to the client apparatus 20, and the print invalidation display screen is displayed to the display unit (not shown) of the client apparatus 20.

If the pixel density of yellow is smaller than the pixel limit density, the print permission/inhibition discriminating unit 16 subsequently compares the pixel density information of black with the pixel limit density information for black with reference to the storing unit 33. If the pixel density is larger than the pixel limit density, the print permission/inhibition discriminating unit 16 determines that the printing is not permitted.

In a manner similar to the above, if the print permission/inhibition discriminating unit 16 determines that the printing is not permitted, the print processing unit 34c instructs the print unit (not shown) to stop the printing process, the notifying unit 18 sends the print non-permission signal to the client apparatus 20, and the print invalidation display screen is displayed to the display unit (not shown) of the client apparatus 20.

If the pixel density of black is smaller than the pixel limit density, the print permission/inhibition discriminating unit 16 determines that the printing is permitted. If the print permission/inhibition discriminating unit 16 determines that the printing is permitted, the print processing unit 34c transfers the image data to the print unit (not shown) and instructs the printing process.

When the image data is received, the print unit (not shown) executes the printing process based on the image data. When the print processing unit 34c instructs the print unit (not shown) to execute the printing process, the notifying unit 18 sends a print permission signal indicative of print validation to the client apparatus 20.

When the print permission signal is received, the client apparatus 20 executes the control program in the memory (not shown) and makes the display unit (not shown) of the client apparatus 20 operative so as to display a print validation display screen showing the print validation. Thus, the user can confirm through the display unit (not shown) that the printing process has been executed in response to a print request.

In the embodiment, since the pixel density information "30% (=yellow)" is larger than the pixel limit density information "15% (=yellow)", it is determined by the print permission/inhibition discriminating unit 16 that the printing is not permitted. The print processing unit 34c instructs the print unit (not shown) to stop the printing process and the notifying unit 18 sends the print non-permission signal to the client apparatus 20. The print invalidation display screen is displayed to the display unit (not shown) of the client apparatus 20. Thus, the user can confirm that the printing process has been stopped since the density of the print-requested image data is high.

Although the embodiment has been described above on the assumption that when either the pixel density of each color or the total pixel density of the colors is larger than the pixel limit density, it is determined that the printing is not permitted, it is also possible to decide that the printing is not permitted only when all of the pixel densities are larger than the pixel limit density.

Operation of the Embodiment 5

The print limiting operation of the image forming apparatus of the embodiment will be described hereinbelow.

Figure 17:
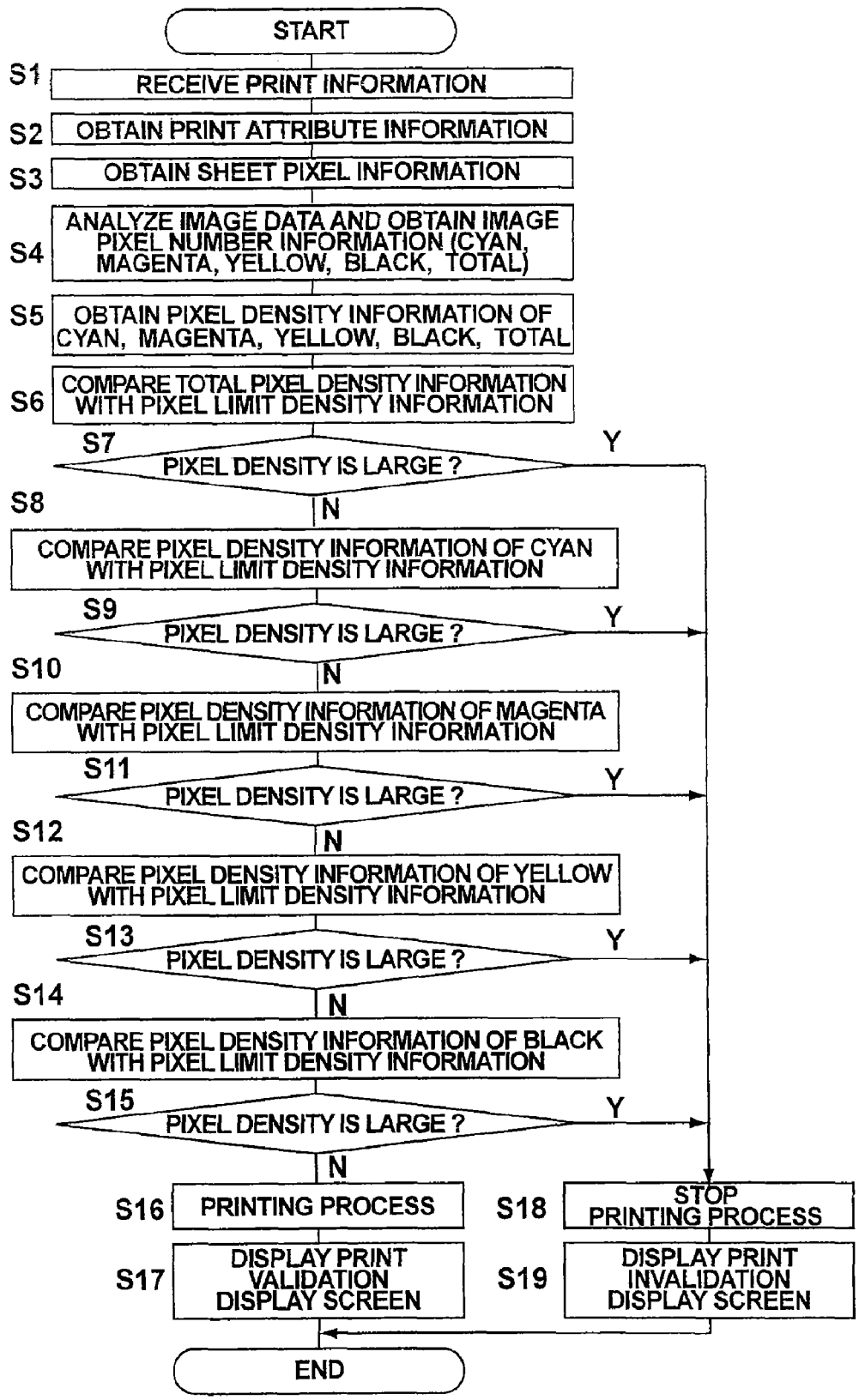
FIG. 17 is a flowchart showing the operation of an image forming apparatus in the embodiment 5.

FIG. 17 is a flowchart for the operation of the image forming apparatus in the embodiment 5.

When the printing is instructed from the user through the input unit (not shown), the client apparatus 20 makes the printer driver 22 operative so as to form the print attribute information comprising: the vertical dimension data showing the vertical dimension of the recording paper to which the printing has been instructed by the user; the lateral dimension data showing the lateral dimension of the recording paper; and the image resolution data showing the image resolution. The client apparatus 20 sends the print information including the formed print attribute information and the print data to the image forming apparatus 30.

In the embodiment, it is assumed that the print attribute information comprising the recording paper vertical dimension of "11 inches", the recording paper lateral dimension of "2 inches", and the image resolution of "300 dpi" is formed. The data showing the size of recording paper is not limited to the vertical/lateral dimensions but, for example, it is also possible to form the print attribute information comprising: the data showing the recording paper size such as "A4", "A5, "B4", or the like; and the image resolution data showing the image resolution. In this case, it is preferable that the vertical/lateral dimensions corresponding to the recording paper size are held on the image forming apparatus 30 side.

When the print information is received from the client apparatus 20 (S1), the control unit 34 of the image forming apparatus 30 transfers the print information to the print information obtaining unit 12.

When the print information is received, the print information obtaining unit 12 analyzes the print information, separates the print data and the print attribute information, and obtains the print attribute information. In the embodiment, it is assumed that the print attribute information comprising the recording paper vertical dimension of "11 inches", recording paper lateral dimension of "2 inches", image resolution of "300 dpi", and print color designation data indicative of either the color image or the monochromatic image is obtained (S2).

When the print information obtaining unit 12 obtains the print attribute information, the control unit 34 forms the image data from the print data on the basis of the print attribute information, holds it into the memory (not shown), and transfers the print attribute information to the sheet pixel obtaining unit 13.

When the print information obtaining unit 12 obtains the print attribute information, the sheet pixel obtaining unit 13 obtains the sheet pixel information YD by applying the recording paper vertical dimension data, recording paper lateral dimension data, image resolution data, and print color designation data included in the print attribute information to the foregoing equation (1) (S3). In this instance, the control unit 34 holds the obtained sheet pixel information into the memory (not shown).

In the embodiment, the print attribute information comprising the recording paper vertical dimension of "11 inches", recording paper lateral dimension of "2 inches", image resolution of "300 dpi", and print color designation data indicative of either the color image or the monochromatic image is obtained. Therefore, the recording paper vertical dimension of "11 inches", recording paper lateral dimension of "2 inches", and image resolution of "300 dpi" are applied to the above equation (1). In the case of the monochromatic image, since one frame is used, "6600 dots" is obtained as sheet pixel information YD. In the case of the color image, since four frames are used, "26400 dots" is calculated as sheet pixel information YD.

When the sheet pixel obtaining unit 13 obtains the sheet pixel information, the image pixel obtaining unit 14 analyzes the image data held in the memory (not shown) and obtains the image pixel number information showing the number of pixels of each of the colors (=cyan, magenta, yellow, black) which are used in the actual printing and the image pixel number information showing the total number of pixels of the colors in the image data (S4).

In the embodiment, GDc (=cyan), GDm (=magenta), GDy (=yellow), GDk (=black), and GD (=total) are obtained as image pixel number information, respectively.

When the image pixel obtaining unit 14 obtains the image pixel number information, respectively, first, the pixel density obtaining unit 15 applies the sheet pixel information YD as the sum of the four frames and the total image pixel number information GD of the colors to the above equation (2), thereby obtaining the pixel density information for the total image pixel number information GD of the colors.

Subsequently, the pixel density obtaining unit 15 applies the sheet pixel information YD and the image pixel number information GD of each color to the above equation (3), thereby obtaining the pixel density information for the image pixel number information of each color (=cyan, magenta, yellow, black) (S5).

In the embodiment, since "660 dots (=cyan)", "660 dots (=magenta)", "660 dots (=black)", "1980 dots (=yellow)", and "3960 dots (=total)" have been obtained as image pixel number information, respectively, "10% (=cyan)", "10% (=magenta)", "10% (=black)", "30% (=yellow)", and "60% (=total)" are obtained as pixel density information for the image pixel number information, respectively.

When the pixel density obtaining unit 15 obtains the pixel density information, respectively, the print permission/inhibition discriminating unit 16 decides the discrimination control method with reference to the discrimination control information in the storing unit 33. In the embodiment, since "1" has been set for each of the colors (=cyan, magenta, yellow, black) and the total of the colors, respectively, all of the pixel densities are used as discrimination targets and the permission or inhibition of the printing is discriminated.

That is, the print permission/inhibition discriminating unit 16 compares the obtained total pixel density information of the colors with the total pixel limit density information for the colors with reference to the storing unit 33 (S6). If the pixel density is larger than the pixel limit density, the print permission/inhibition discriminating unit 16 determines that the printing is not permitted (S7).

When the print permission/inhibition discriminating unit 16 determines that the printing is not permitted, the print processing unit 34c instructs the print unit (not shown) to stop the printing process (S18).

When the print processing unit 34c instructs the print unit (not shown) to stop the printing process, the notifying unit 18 sends the print non-permission signal indicative of print invalidation to the client apparatus 20.

When the print non-permission signal is received, the client apparatus 20 executes the control program in the memory (not shown) and makes the display unit (not shown) operative so as to display the print invalidation display screen showing the print invalidation (S19). Thus, the user can confirm that the printing process has been stopped since the density of the print-requested image data is high.

If the total pixel density of the colors is smaller than the pixel limit density, the print permission/inhibition discriminating unit 16 subsequently compares the pixel density information of cyan with the pixel limit density information for cyan with reference to the storing unit 33 (S8). If the pixel density is larger than the pixel limit density, the print permission/inhibition discriminating unit 16 determines that the printing is not permitted (S9).

In a manner similar to the above, if the print permission/inhibition discriminating unit 16 determines that the printing is not permitted, the print processing unit 34c instructs the print unit (not shown) to stop the printing process (S18), the notifying unit 18 sends the print non-permission signal to the client apparatus 20, and the print invalidation display screen is displayed to the display unit (not shown) of the client apparatus 20 (S19).

If the pixel density of cyan is smaller than the pixel limit density, the print permission/inhibition discriminating unit 16 subsequently compares the pixel density information of magenta with the pixel limit density information for magenta with reference to the storing unit 33 (S10). If the pixel density is larger than the pixel limit density, the print permission/inhibition discriminating unit 16 determines that the printing is not permitted (S11).

In a manner similar to the above, if the print permission/inhibition discriminating unit 16 determines that the printing is not permitted, the print processing unit 34c instructs the print unit (not shown) to stop the printing process (S18), the notifying unit 18 sends the print non-permission signal to the client apparatus 20, and the print invalidation display screen is displayed to the display unit (not shown) of the client apparatus 20 (S19).

If the pixel density of magenta is smaller than the pixel limit density, the print permission/inhibition discriminating unit 16 subsequently compares the pixel density information of yellow with the pixel limit density information for yellow with reference to the storing unit 33 (S12). If the pixel density is larger than the pixel limit density, the print permission/inhibition discriminating unit 16 determines that the printing is not permitted (S13).

In a manner similar to the above, if the print permission/inhibition discriminating unit 16 determines that the printing is not permitted, the print processing unit 34c instructs the print unit (not shown) to stop the printing process (S18), the notifying unit 18 sends the print non-permission signal to the client apparatus 20, and the print invalidation display screen is displayed to the display unit (not shown) of the client apparatus 20 (S19).

If the pixel density of yellow is smaller than the pixel limit density, the print permission/inhibition discriminating unit 16 subsequently compares the pixel density information of black with the pixel limit density information for black with reference to the storing unit 33 (S14). If the pixel density is larger than the pixel limit density, the print permission/inhibition discriminating unit 16 determines that the printing is not permitted (S15).

In a manner similar to the above, if the print permission/inhibition discriminating unit 16 determines that the printing is not permitted, the print processing unit 34c instructs the print unit (not shown) to stop the printing process (S18), the notifying unit 18 sends the print non-permission signal to the client apparatus 20, and the print invalidation display screen is displayed to the display unit (not shown) of the client apparatus 20 (S19).

If the pixel density of black is smaller than the pixel limit density, the print permission/inhibition discriminating unit 16 determines that the printing is permitted (S15). If the print permission/inhibition discriminating unit 16 determines that the printing is permitted, the print processing unit 34c transfers the image data to the print unit (not shown) and instructs the printing process. When the image data is received, the print unit (not shown) executes the printing process based on the image data (S16).

When the print processing unit 34c instructs the print unit (not shown) to execute the printing process, the notifying unit 18 sends the print permission signal indicative of the print validation to the client apparatus 20.

When the print permission signal is received, the client apparatus 20 executes the control program in the memory (not shown) and makes the display unit (not shown) of the client apparatus 20 operative so as to display the print validation display screen showing the print validation (S17). Thus, the user can confirm through the display unit (not shown) that the printing process has been executed in response to a print request.

In the embodiment, since the pixel density information "30% (=yellow)" is larger than the pixel limit density information "15% (=yellow)", it is determined by the print permission/inhibition discriminating unit 16 that the printing is not permitted. The print processing unit 34c instructs the print unit (not shown) to stop the printing process and the notifying unit 18 sends the print non-permission signal to the client apparatus 20. The print invalidation display screen is displayed to the display unit (not shown) of the client apparatus 20. Thus, the user can confirm that the printing process has been stopped since the density of the print-requested image data is high.

Although the embodiment has been described above on the assumption that when either the pixel density of each color or the total pixel density of the colors is larger than the pixel limit density, it is determined that the printing is not permitted, it is also possible to decide that the printing is not permitted only when all of the pixel densities are larger than the pixel limit density.

Although the embodiment has been described with respect to the example in which the invention is applied to the image recording apparatus of the electrophotographic process using the developer (=toner), the invention is not limited to such an example but can be also applied to an image forming apparatus of an ink jet system using ink or an image forming apparatus of a wire dot system using an ink ribbon.

Effects of the Embodiment 5

In the image forming apparatus of the embodiment, there is provided the storing unit 33 in which the pixel limit density information serving as limit reference values of the high-density printing and showing the pixel density of each color and the total pixel density of the colors has been stored. When the print information including the print attribute information (comprising the recording paper dimension data showing the dimensions of the recording paper, the image resolution data showing the resolution of the image, and the print color designation data indicative of either the color image or the monochromatic image) and the print data is received from the client apparatus 20, the print attribute information is obtained from the print information. On the basis of the obtained print attribute information, the sheet pixel information showing the maximum number of recordable pixels of the recording paper is obtained. The image pixel information showing the number of pixels of each color existing in the image data as a print target and the image pixel information showing the total number of pixels of the colors are obtained, respectively. On the basis of the obtained sheet pixel information and the image pixel information of each color and the total image pixel information of the colors, the pixel density information showing the pixel density of the image data of each color and the pixel density information showing the total pixel density of the image data of the colors are obtained. Each of the obtained pixel density information is compared with each pixel limit density information in the storing unit. If one of the pixel densities is larger than the pixel limit density, it is determined that the printing is not permitted. Even if the number of recording paper is within the number of printable recording paper, the printing process is stopped. Therefore, an amount of consumption of the consumables can be suppressed. Thus, it is possible to prevent the consumables from being rapidly consumed.

Embodiment 6

Construction of the Embodiment 6

Figure 18:
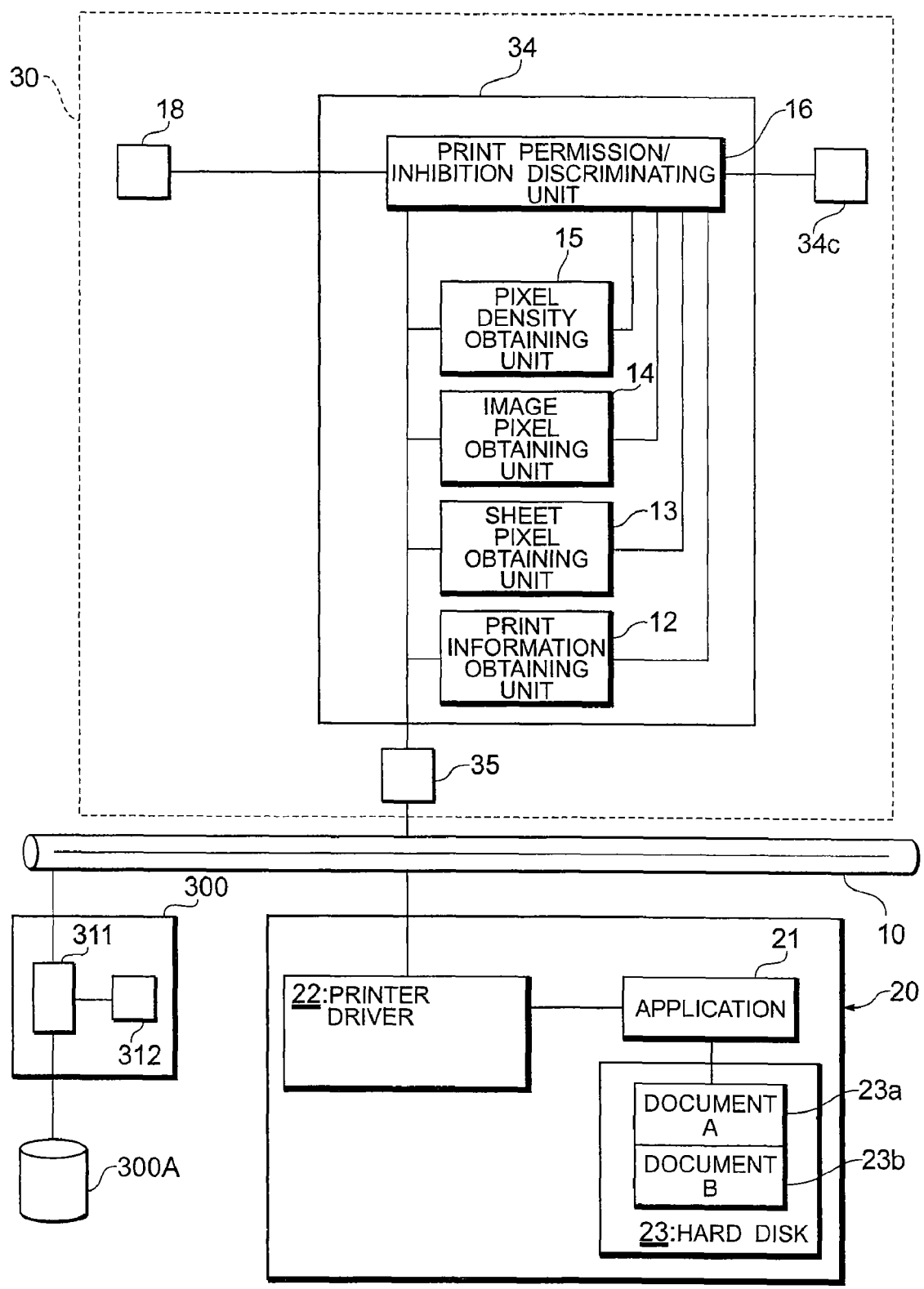
FIG. 18 is a block constructional diagram showing an image forming system in the embodiment 6.

FIG. 18 is a block constructional diagram showing an image forming system of the embodiment 6.

As shown in FIG. 18, the image forming system of the embodiment 6 is constructed by: a plurality of image forming apparatuses 30; the client apparatus 20; a managing apparatus 300; and a database 300A. The client apparatus 20 and the managing apparatus 300 are connected to the image forming apparatus 30 through the network. The database 300A is connected to the managing apparatus 300.

Although the embodiment 5 has the construction in which the pixel limit density information of each color, the total pixel limit density information of the colors, and the discrimination control information have been stored in the storing unit 33, the embodiment 6 has a construction in which each of the pixel limit density information and the discrimination control information are held in the database 300A and the managing apparatus 300 unitarily manages those information in the database 300A.

The database 300A is a database in which the pixel limit density information of each color, the total pixel limit density information of the colors, and the discrimination control information have been stored. The pixel limit density information (refer to FIG. 15) and the discrimination control information (refer to FIG. 16) are the information similar to those in the embodiment 5.

In a manner similar to the embodiment 5, when the pixel density obtaining unit 15 obtains the pixel density information of each color and the total pixel limit density information of the colors, respectively, the print permission/inhibition discriminating unit 16 of the image forming apparatus 30 of the embodiment sends a data request signal to obtain the pixel limit density information of each color, the total pixel limit density information of the colors, and the discrimination control information from the database 300A to the managing apparatus 300.

A control unit 311 of the managing apparatus 300 is a control unit which functions as so called a CPU and integratedly controls the managing apparatus 300. When the data request signal is received, the control unit 311 transfers the data request signal to a data obtaining unit 312.

The data obtaining unit 312 is an obtaining unit to obtain the data from the database 300A. When the data request signal is received, the data obtaining unit 312 obtains the pixel limit density information of each color, the total pixel limit density information of the colors, and the discrimination control information with reference to the database 300A, respectively.

When the data obtaining unit 312 obtains those data, the control unit 311 sends the obtained pixel limit density information of each color, the obtained total pixel limit density information of the colors, and the obtained discrimination control information to the image forming apparatus 30.

When the control unit 34 of the image forming apparatus 30 receives the pixel limit density information of each color, the total pixel limit density information of the colors, and the discrimination control information, it stores those information into the memory (not shown).

When the pixel limit density information of each color, the total pixel limit density information of the colors, and the discrimination control information are stored into the memory, first, the print permission/inhibition discriminating unit 16 decides the discrimination control method with reference to discrimination control information in the memory. In the embodiment, since "1" has been set for each of the colors (=cyan, magenta, yellow, black) and the total of the colors, respectively, all of the pixel densities are used as discrimination targets and the permission or inhibition of the printing is discriminated.

That is, the print permission/inhibition discriminating unit 16 compares the obtained total pixel density information of the colors with the total pixel limit density information for the colors with reference to the memory. If the pixel density is larger than the pixel limit density, the print permission/inhibition discriminating unit 16 determines that the printing is not permitted.

If the print permission/inhibition discriminating unit 16 determines that the printing is not permitted, in a manner similar to the embodiment 5, the print processing unit 34c instructs the print unit (not shown) to stop the printing process. The notifying unit 18 sends the print non-permission signal to the client apparatus 20. The print invalidation display screen is displayed to the display unit (not shown) of the client apparatus 20.

If the pixel density of cyan is smaller than the pixel limit density, the print permission/inhibition discriminating unit 16 subsequently compares the pixel density information of magenta with the pixel limit density information for magenta with reference to the memory. If the pixel density is larger than the pixel limit density, the print permission/inhibition discriminating unit 16 determines that the printing is not permitted.

In a manner similar to the above, if the print permission/inhibition discriminating unit 16 determines that the printing is not permitted, the print processing unit 34c instructs the print unit (not shown) to stop the printing process, the notifying unit 18 sends the print non-permission signal to the client apparatus 20, and the print invalidation display screen is displayed to the display unit (not shown) of the client apparatus 20.

If the pixel density of magenta is smaller than the pixel limit density, the print permission/inhibition discriminating unit 16 subsequently compares the pixel density information of yellow with the pixel limit density information for yellow with reference to the memory. If the pixel density is larger than the pixel limit density, the print permission/inhibition discriminating unit 16 determines that the printing is not permitted.

In a manner similar to the above, if the print permission/inhibition discriminating unit 16 determines that the printing is not permitted, the print processing unit 34c instructs the print unit (not shown) to stop the printing process, the notifying unit 18 sends the print non-permission signal to the client apparatus 20, and the print invalidation display screen is displayed to the display unit (not shown) of the client apparatus 20.

If the pixel density of yellow is smaller than the pixel limit density, the print permission/inhibition discriminating unit 16 subsequently compares the pixel density information of black with the pixel limit density information for black with reference to the memory. If the pixel density is larger than the pixel limit density, the print permission/inhibition discriminating unit 16 determines that the printing is not permitted.

In a manner similar to the above, if the print permission/inhibition discriminating unit 16 determines that the printing is not permitted, the print processing unit 34c instructs the print unit (not shown) to stop the printing process, the notifying unit 18 sends the print non-permission signal to the client apparatus 20, and the print invalidation display screen is displayed to the display unit (not shown) of the client apparatus 20.

If the pixel density of black is smaller than the pixel limit density, the print permission/inhibition discriminating unit 16 determines that the printing is permitted. When the print permission/inhibition discriminating unit 16 determines that the printing is permitted, the print processing unit 34c transfers the image data to the print unit (not shown) and instructs the printing process. When the image data is received, the print unit (not shown) executes the printing process on the basis of the image data.

When the print processing unit 34c instructs the printing process to the print unit (not shown), the notifying unit 18 sends the print permission signal showing the print validation to the client apparatus 20.

When the print permission signal is received, the client apparatus 20 executes the control program in the memory (not shown) and makes the display unit (not shown) of the client apparatus 20 operative so as to display the print validation display screen showing the print validation. Thus, the user can confirm through the display unit (not shown) that the printing process has been executed in response to the print request.

In the embodiment, since the pixel density information "30% (=yellow)" is larger than the pixel limit density information "15% (=yellow)", it is determined by the print permission/inhibition discriminating unit 16 that the printing is not permitted. The print processing unit 34c instructs the print unit (not shown) to stop the printing process and the notifying unit 18 sends the print non-permission signal to the client apparatus 20. The print invalidation display screen is displayed to the display unit (not shown) of the client apparatus 20. Thus, the user can confirm that the printing process has been stopped since the density of the print-requested image data is high.

Operation of the Embodiment 6

The print limiting operation of the image forming system of the embodiment 6 will be described hereinbelow.

In the description of the operation, explanation will be made with respect to the operation which is executed after the pixel density obtaining unit 15 obtained the pixel density information of each color and the total pixel density information of the colors and which differs from that in the embodiment 5.

Figure 19:
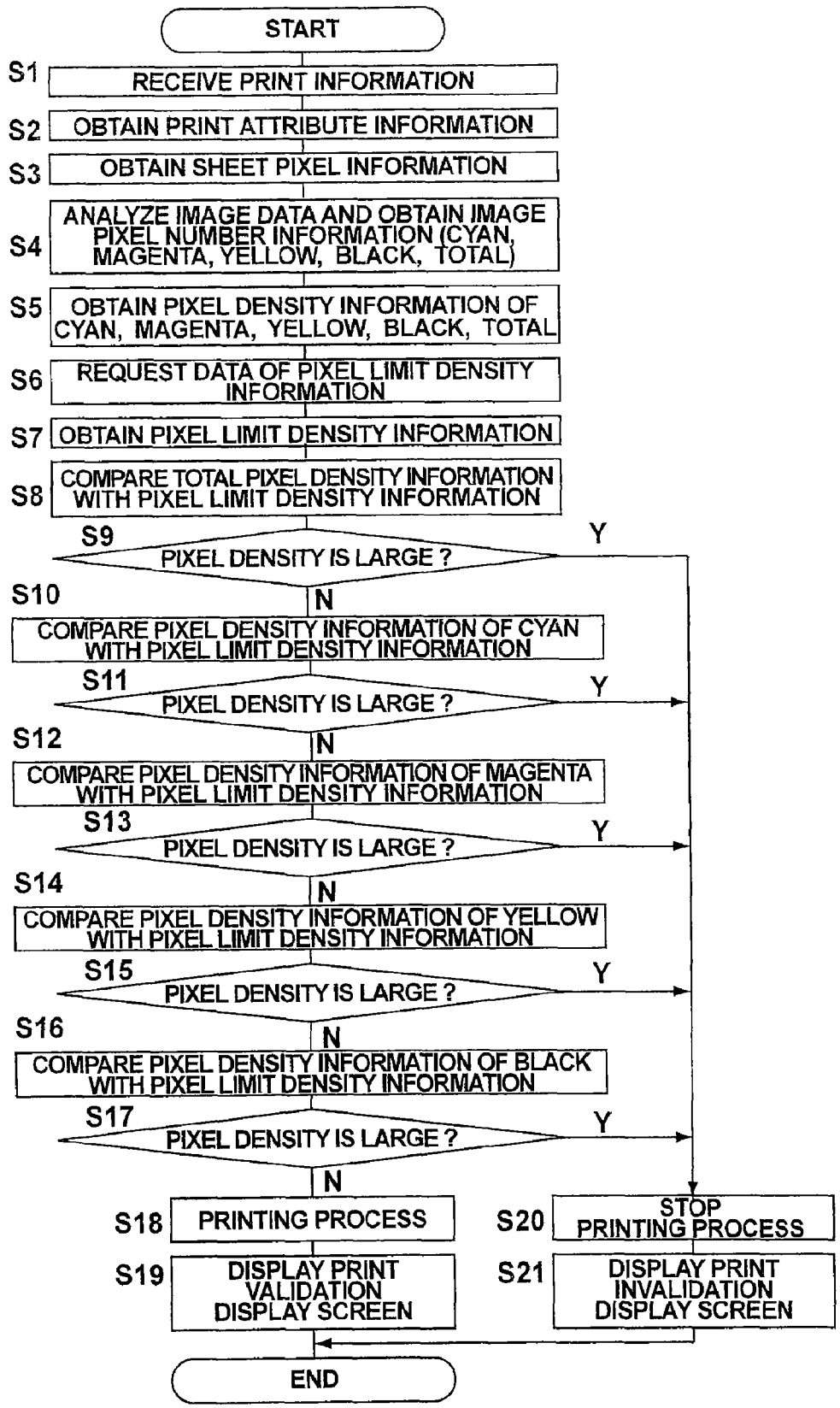
FIG. 19 is a flowchart showing the operation of the image forming system in the embodiment 6.

FIG. 19 is a flowchart for the operation of the image forming system in the embodiment 6.

When the pixel density obtaining unit 15 obtains the pixel density information of each color and the total pixel density information of the colors, the print permission/inhibition discriminating unit 16 of the image forming apparatus 30 in the embodiment sends the data request signal to obtain the pixel limit density information of each color, the total pixel limit density information of the colors, and the discrimination control information to the managing apparatus 300 (S6).

When the data request signal is received, the control unit 311 of the managing apparatus 300 transfers the data request signal to the data obtaining unit 312.

When the data request signal is received, the data obtaining unit 312 obtains the pixel limit density information of each color, the total pixel limit density information of the colors, and the discrimination control information with reference to the database 300A.

When the data obtaining unit 312 completes the data obtainment, the control unit 311 sends the obtained pixel limit density information of each color, the obtained total pixel limit density information of the colors, and the obtained discrimination control information to the image forming apparatus 30.

When the control unit 34 of the image forming apparatus 30 receives the pixel limit density information of each color, the total pixel limit density information of the colors, and the discrimination control information, it stores those information into the memory (not shown) (S7).

When the pixel limit density information of each color, the total pixel limit density information of the colors, and the discrimination control information are stored into the memory, first, the print permission/inhibition discriminating unit 16 decides the discrimination control method with reference to discrimination control information in the memory. In the embodiment, since "1" has been set for each of the colors (=cyan, magenta, yellow, black) and the total of the colors, respectively, all of the pixel densities are used as discrimination targets and the permission or inhibition of the printing is discriminated.

That is, the print permission/inhibition discriminating unit 16 compares the obtained total pixel density information of the colors with the total pixel limit density information for the colors with reference to the memory (S8). If the pixel density is larger than the pixel limit density, the print permission/inhibition discriminating unit 16 determines that the printing is not permitted (S9).

If the print permission/inhibition discriminating unit 16 determines that the printing is not permitted, in a manner similar to the embodiment 5, the print processing unit 34c instructs the print unit (not shown) to stop the printing process (S20). The notifying unit 18 sends the print non-permission signal to the client apparatus 20. The print invalidation display screen is displayed to the display unit (not shown) of the client apparatus 20 (S21).

If the total pixel density is smaller than the pixel limit density, the print permission/inhibition discriminating unit 16 subsequently compares the pixel density information of cyan with the pixel limit density information for cyan with reference to the memory (S10). If the pixel density is larger than the pixel limit density, the print permission/inhibition discriminating unit 16 determines that the printing is not permitted (S11).

In a manner similar to the above, if the print permission/inhibition discriminating unit 16 determines that the printing is not permitted, the print processing unit 34c instructs the print unit (not shown) to stop the printing process (520), the notifying unit 18 sends the print non-permission signal to the client apparatus 20, and the print invalidation display screen is displayed to the display unit (not shown) of the client apparatus 20 (S21).

If the pixel density of cyan is smaller than the pixel limit density, the print permission/inhibition discriminating unit 16 subsequently compares the pixel density information of magenta with the pixel limit density information for magenta with reference to the memory (S12). If the pixel density is larger than the pixel limit density, the print permission/inhibition discriminating unit 16 determines that the printing is not permitted (S13).

In a manner similar to the above, if the print permission/inhibition discriminating unit 16 determines that the printing is not permitted, the print processing unit 34c instructs the print unit (not shown) to stop the printing process (S20), the notifying unit 18 sends the print non-permission signal to the client apparatus 20, and the print invalidation display screen is displayed to the display unit (not shown) of the client apparatus 20 (S21).

If the pixel density of magenta is smaller than the pixel limit density, the print permission/inhibition discriminating unit 16 subsequently compares the pixel density information of yellow with the pixel limit density information for yellow with reference to the memory (S14). If the pixel density is larger than the pixel limit density, the print permission/inhibition discriminating unit 16 determines that the printing is not permitted (S15).

In a manner similar to the above, if the print permission/inhibition discriminating unit 16 determines that the printing is not permitted, the print processing unit 34c instructs the print unit (not shown) to stop the printing process (S20), the notifying unit 18 sends the print non-permission signal to the client apparatus 20, and the print invalidation display screen is displayed to the display unit (not shown) of the client apparatus 20 (S21).

If the pixel density of yellow is smaller than the pixel limit density, the print permission/inhibition discriminating unit 16 subsequently compares the pixel density information of black with the pixel limit density information for black with reference to the memory (S16). If the pixel density is larger than the pixel limit density, the print permission/inhibition discriminating unit 16 determines that the printing is not permitted (S17).

In a manner similar to the above, if the print permission/inhibition discriminating unit 16 determines that the printing is not permitted, the print processing unit 34c instructs the print unit (not shown) to stop the printing process (S20), the notifying unit 18 sends the print non-permission signal to the client apparatus 20, and the print invalidation display screen is displayed to the display unit (not shown) of the client apparatus 20 (S21).

If the pixel density of black is smaller than the pixel limit density, the print permission/inhibition discriminating unit 16 determines that the printing is permitted (S17). When the print permission/inhibition discriminating unit 16 determines that the printing is permitted, the print processing unit 34c transfers the image data to the print unit (not shown) and instructs the printing process. When the image data is received, the print unit (not shown) executes the printing process on the basis of the image data (S18).

When the print processing unit 34c instructs the printing process to the print unit (not shown), the notifying unit 18 sends the print permission signal showing the print validation to the client apparatus 20.

When the print permission signal is received, the client apparatus 20 executes the control program in the memory (not shown) and makes the display unit (not shown) of the client apparatus 20 operative so as to display the print validation display screen showing the print validation (S19). Thus, the user can confirm through the display unit (not shown) that the printing process has been executed in response to the print request.

In the embodiment, since the pixel density information "30% (=yellow)" is larger than the pixel limit density information "15% (=yellow)", it is determined by the print permission/inhibition discriminating unit 16 that the printing is not permitted. The print processing unit 34c instructs the print unit (not shown) to stop the printing process and the notifying unit 18 sends the print non-permission signal to the client apparatus 20. The print invalidation display screen is displayed to the display unit (not shown) of the client apparatus 20.

Although the embodiment has been described above on the assumption that when either the pixel density of each color or the total pixel density of the colors is larger than the pixel limit density, it is determined that the printing is not permitted, it is also possible to decide that the printing is not permitted only when all of the pixel densities are larger than the pixel limit density.

Although the embodiment has been described with respect to the example in which the invention is applied to the image recording apparatus of the electrophotographic process using the developer (=toner), the invention is not limited to such an example but can be also applied to an image forming apparatus of an ink jet system using ink or an image forming apparatus of a wire dot system using an ink ribbon.

Effects of the Embodiment 6

In the image forming system of the embodiment, the database 300A in which the pixel limit density information serving as limit reference values of the high-density printing and showing the pixel density of each color and the total pixel density of the colors has been held is unitarily managed by the managing apparatus 300. When the print information including at least the print attribute information (comprising the recording paper dimension data showing the dimensions of the recording paper, the image resolution data showing the resolution of the image, and the print color designation data indicative of either the color image or the monochromatic image) and the print data is received from the client apparatus 20, the print attribute information is obtained from the print information. On the basis of the obtained print attribute information, the sheet pixel information showing the maximum number of recordable pixels of the recording paper is obtained. The image pixel information showing the number of pixels of each color existing in the image data as a print target and the image pixel information showing the total number of pixels of the colors are obtained, respectively. On the basis of the obtained sheet pixel information and the image pixel information of each color and the total image pixel information of the colors, the pixel density information showing the pixel density of the image data of each color and the pixel density information showing the total pixel density of the image data of the colors are obtained. Each of the obtained pixel density information is compared with each pixel limit density information which is obtained from the database 300A through the managing apparatus 300. If one of the pixel densities is larger than the pixel limit density, it is determined that the printing is not permitted. Even if the number of recording paper is within the number of printable recording paper, the printing process is stopped. Therefore, the consumption amount of the consumables can be suppressed. Thus, it is possible to prevent the consumables from being rapidly consumed. Since the pixel limit density information is unitarily managed in the database 300A by the managing apparatus 300, there is no need to update the pixel limit density information every image forming apparatus. The pixel limit density information can be easily updated.

Embodiment 7

Construction of the Embodiment 7

Figure 20:
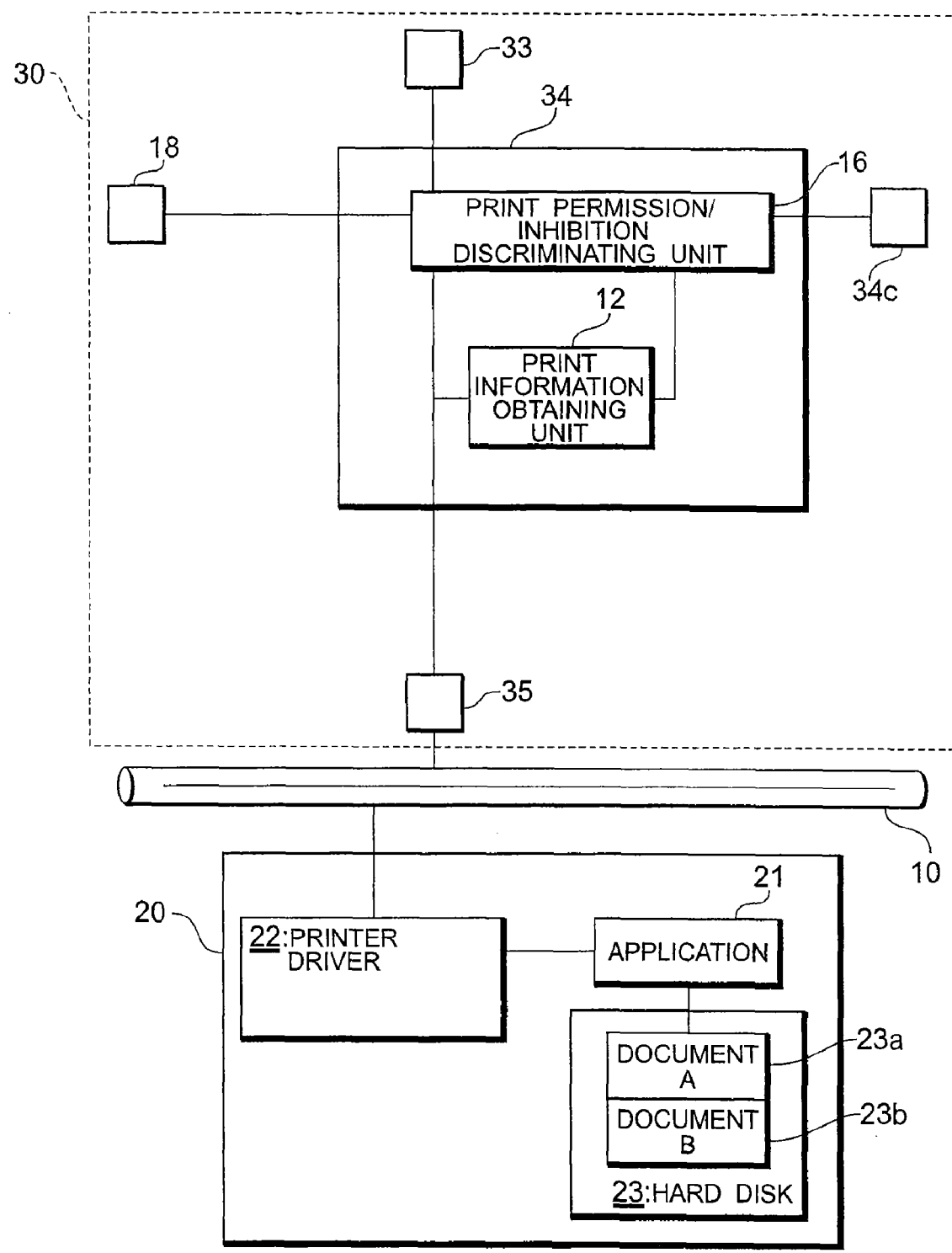
FIG. 20 is a block constructional diagram showing an image forming apparatus in the embodiment 7.

FIG. 20 is a block constructional diagram showing an image forming apparatus of the embodiment 7.

As shown in FIG. 20, the image forming apparatus 30 of the embodiment is constructed by the control unit 34, storing unit 33, print information obtaining unit 12, print permission/inhibition discriminating unit 16, print processing unit 34c, and notifying unit 18. The image forming apparatus 30 is connected to the client apparatus 20 through the network 10.

The storing unit 33 is a memory in which non-target application data has previously been stored. The non-target application data is information showing an application name out of the limitation targets of the high-density printing as shown in FIG. 21. In the embodiment, information showing the application name such as word processor software, spreadsheet software, E-mail software, or the like in which it is presumed that a print request of the image data of the high density is not made has been stored as non-target application data.

The workstation, PC, or the like is used as a client apparatus 20. When the printing is instructed from the user through the input unit (not shown), the client apparatus 20 makes the printer driver 22 operative so as to form the print attribute information comprising: the application data showing the name of the application by which the print data serving as a print target has been formed; the vertical dimension data showing the vertical dimension of the recording paper to which the printing has been instructed by the user; the lateral dimension data showing the lateral dimension of the recording paper; the image resolution data showing the image resolution; and the print color designation data indicative of either the color image or the monochromatic image. The client apparatus 20 sends the print information including the formed print attribute information and the print data to the image forming apparatus 30.

In the embodiment, it is assumed that there is formed the print attribute information comprising: the application data showing "image editing software" in which the density of the image data which is formed is high; the vertical dimension data of "11 inches"; the lateral dimension data of "2 inches"; the image resolution data of "300 dpi"; and the print color designation data indicative of either the color image or the monochromatic image. The data showing the size of recording paper is not limited to the vertical/lateral dimensions but, for example, it is also possible to form the print attribute information comprising: the data showing the recording paper size such as "A4", "A5", "B4", or the like; the image resolution data showing the image resolution; and the print color designation data indicative of either the color image or the monochromatic image. In this case, it is preferable that the vertical/lateral dimensions corresponding to the recording paper size are held on the image forming apparatus 30 side.

The control unit 34 of the image forming apparatus 30 is a control unit which functions as so called a CPU and integratedly controls the image forming apparatus 30. When the print information is received from the client apparatus 20, the control unit 34 transfers the print information to the print information obtaining unit 12.

The print information obtaining unit 12 is an obtaining unit for obtaining the print attribute information from the print information. When the print information is received, the print information obtaining unit 12 analyzes the print information and separates the print data and the print attribute information therefrom, thereby obtaining the print attribute information comprising: the application data; the vertical dimension data; the lateral dimension data; the image resolution data; and the print color designation data. In the embodiment, there is obtained the print attribute information comprising: the application data of the "image editing software"; the vertical dimension data of "11 inches"; the lateral dimension data of "2 inches"; the image resolution data of "300 dpi"; and the print color designation data indicative of either the color image or the monochromatic image.

When the print information obtaining unit 12 obtains the print attribute information, the control unit 34 forms the image data from the print data on the basis of the print attribute information, holds it into the memory (not shown), and transfers the print attribute information to the print permission/inhibition discriminating unit 16.

The print permission/inhibition discriminating unit 16 is a discriminating unit for discriminating the necessity of the print limitation. When the print attribute information is received, the print permission/inhibition discriminating unit 16 searches the storing unit 33 on the basis of the application data in the print attribute information. If the non-target application data showing the application name which coincides with the application data has been held, the print permission/inhibition discriminating unit 16 determines that the printing is permitted. Although the embodiment has been described with respect to the example in which the permission or inhibition of the printing is discriminated by the application name, the invention is not limited to such an example but, for example, it is also possible to use a construction in which the permission or inhibition of the printing is discriminated by an identifier (=file name. ***) added to the name of the file formed by the application.

The print processing unit 34c is a control unit to make the print control in accordance with the discrimination result about the permission or inhibition of the printing. If the print permission/inhibition discriminating unit 16 determines that the printing is permitted, the print processing unit 34c transfers the image data to the print unit (not shown) and instructs the printing process. When the image data is received, the print unit (not shown) executes the printing process on the basis of the image data.

The notifying unit 18 is a notifying unit to notify the client apparatus 20 of the print result. When the print processing unit 34c instructs the print unit (not shown) to execute the printing process, the notifying unit 18 sends the print permission signal indicative of the print validation to the client apparatus 20.

When the print permission signal is received, the client apparatus 20 executes the control program in the memory (not shown) and makes the display unit (not shown) operative so as to display the print validation display screen showing the print validation. Thus, the user can confirm through the display unit (not shown) that the printing process has been executed in response to the print request.

If the non-target application data showing the application name which coincides with the application data is not held, the print permission/inhibition discriminating unit 16 decides that the printing is not permitted.

In the embodiment, the print permission/inhibition discriminating unit 16 searches the storing unit 33 on the basis of the application data of the "image editing software". Since the non-target application data which coincides with the application data of the "image editing software" is not held, the print permission/inhibition discriminating unit 16 determines that the printing is not permitted.

When the print permission/inhibition discriminating unit 16 determines that the printing is not permitted, the print processing unit 34c instructs the print unit (not shown) to stop the printing process.

When the print processing unit 34c instructs the print unit (not shown) to stop the printing process, the notifying unit 18 sends the print non-permission signal indicative of the print invalidation to the client apparatus 20.

When the print non-permission signal is received, the client apparatus 20 executes the control program in the memory (not shown) and makes the display unit (not shown) operative so as to display the print invalidation display screen showing the print invalidation. Thus, the user decides that the print-requested image data has been formed by the application which executes the high-density printing. The user can confirm through the display unit (not shown) that the printing process has been stopped.

Operation of the Embodiment 7

The print limiting operation of the image forming apparatus of the embodiment 7 will be described hereinbelow.

Figure 22:
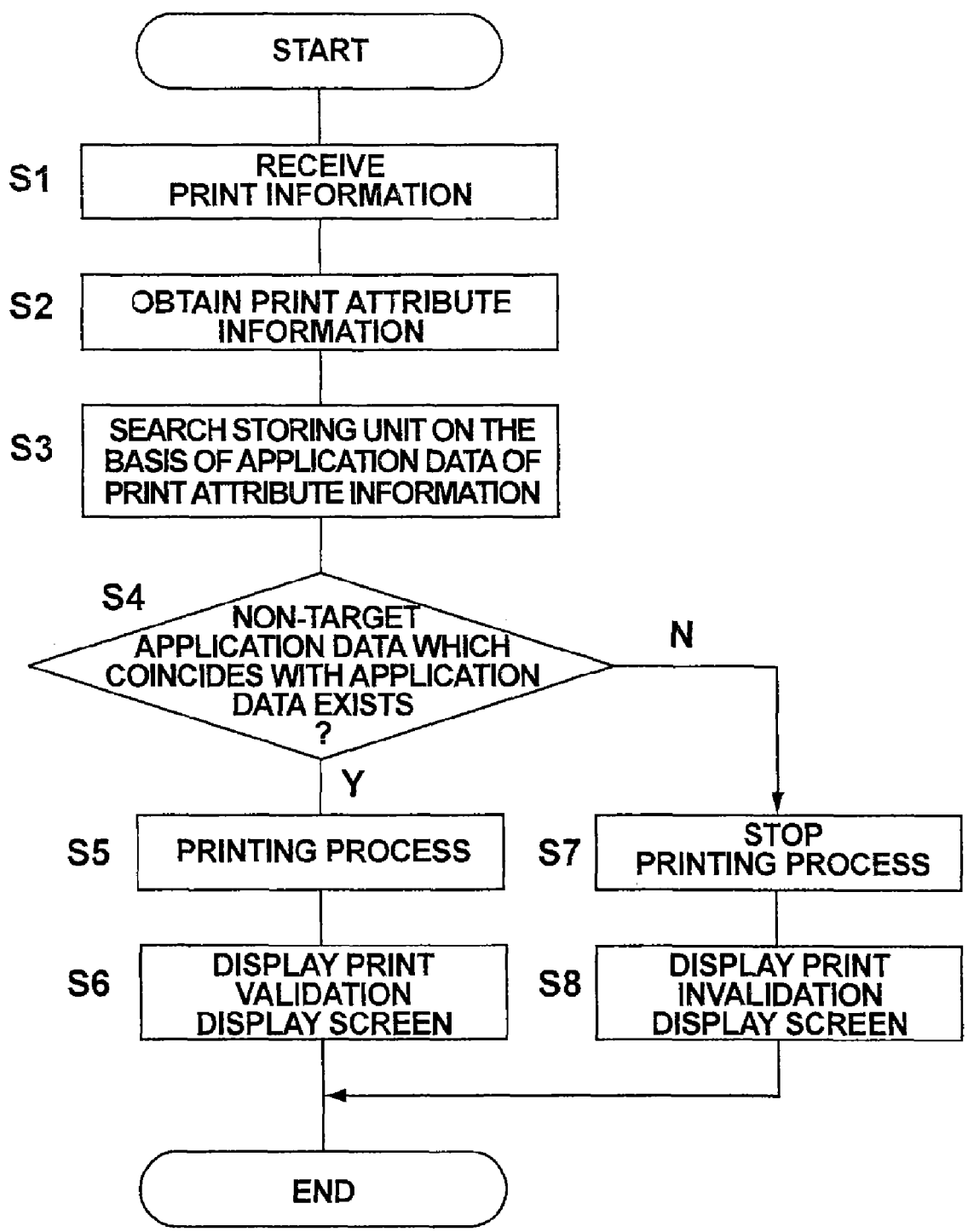
FIG. 22 is a flowchart showing the operation of the image forming apparatus in the embodiment 7.

FIG. 22 is a flowchart for the operation of the image forming apparatus in the embodiment 7.

When the printing is instructed from the user through the input unit (not shown), the client apparatus 20 makes the printer driver in the memory (not shown) operative so as to form the print attribute information comprising: the application data showing the name of the application by which the print data serving as a print target has been formed; the vertical dimension data showing the vertical dimension of the recording paper to which the printing has been instructed by the user; the lateral dimension data showing the lateral dimension of the recording paper; the image resolution data showing the image resolution; and the print color designation data indicative of either the color image or the monochromatic image. The client apparatus 20 sends the print information including the formed print attribute information and the print data to the image forming apparatus 30.

In the embodiment, it is assumed that there is formed the print attribute information comprising: the application data showing the "image editing software" in which the density of the image data which is formed is high; the vertical dimension data of "11 inches"; the lateral dimension data of "2 inches"; the image resolution data of "300 dpi"; and the print color designation data indicative of either the color image or the monochromatic image. The data showing the size of recording paper is not limited to the vertical/lateral dimensions but, for example, it is also possible to form the print attribute information comprising: the data showing the recording paper size such as "A4", "A5, "B4", or the like; the image resolution data showing the resolution; and the print color designation data. In this case, it is preferable that the vertical/lateral dimensions corresponding to the recording paper size are held on the image forming apparatus 30 side.

When the print information is received from the client apparatus 20 (S1), the control unit 34 of the image forming apparatus 30 transfers the print information to the print information obtaining unit 12.

When the print information is received, the print information obtaining unit 12 analyzes the print information and separates the print data and the print attribute information therefrom, thereby obtaining the print attribute information comprising: the application data; the vertical dimension data; the lateral dimension data; the image resolution data; and the print color designation data. In the embodiment, there is obtained the print attribute information comprising: the application data of the "image editing software"; the vertical dimension data of "11 inches"; the lateral dimension data of "2 inches"; the image resolution data of "300 dpi"; and the print color designation data indicative of either the color image or the monochromatic image (S2).

When the print information obtaining unit 12 obtains the print attribute information, the control unit 34 forms the image data from the print data on the basis of the print attribute information, holds the formed image data into the memory (not shown), and transfers the print attribute information to the print permission/inhibition discriminating unit 16.

When the print attribute information is received, the print permission/inhibition discriminating unit 16 searches the storing unit 33 on the basis of the application data in the print attribute information (S3). If the non-target application data showing the application name which coincides with the application data has been held, the print permission/inhibition discriminating unit 16 determines that the printing is permitted (S4).

If the print permission/inhibition discriminating unit 16 determines that the printing is permitted, the print processing unit 34c transfers the image data to the print unit (not shown) and instructs the printing process (S5). When the image data is received, the print unit (not shown) executes the printing process on the basis of the image data.

When the print processing unit 34c instructs the print unit (not shown) to execute the printing process, the notifying unit 18 sends the print permission signal indicative of the print validation to the client apparatus 20.

When the print permission signal is received, the client apparatus 20 executes the control program in the memory (not shown) and makes the display unit (not shown) operative so as to display the print validation display screen showing the print validation (S6). Thus, the user can confirm through the display unit (not shown) that the printing process has been executed in response to the print request.

If the non-target application data showing the application name which coincides with the application data is not held, the print permission/inhibition discriminating unit 16 decides that the printing is not permitted (S4).

If the print permission/inhibition discriminating unit 16 determines that the printing is not permitted, the print processing unit 34c instructs the print unit (not shown) to stop the printing process (S7).

When the print processing unit 34c instructs the print unit (not shown) to stop the printing process, the notifying unit 18 sends the print non-permission signal indicative of the print invalidation to the client apparatus 20.

When the print non-permission signal is received, the client apparatus 20 executes the control program in the memory (not shown) and makes the display unit (not shown) operative so as to display the print invalidation display screen showing the print invalidation (S8). Thus, the user decides that the print-requested image data has been formed by the application which executes the high-density printing. The user can confirm through the display unit (not shown) that the printing process has been stopped.

In the embodiment, the storing unit 33 is searched by the print permission/inhibition discriminating unit 16 on the basis of the application data of the "image editing software" and since the non-target application data which coincides with the application data of the "image editing software" is not held, it is decided that the printing is not permitted. The print processing unit 34c instructs the print unit (not shown) to stop the printing process, the notifying unit 18 sends the print non-permission signal to the client apparatus 20, and the print invalidation display screen is displayed to the display unit (not shown) of the client apparatus 20.

Although the embodiment has been described with respect to the example in which the permission or inhibition of the printing is discriminated by the application name, the invention is not limited to such an example but, for example, it is also possible to use a construction in which the permission or inhibition of the printing is discriminated by an identifier (=file name. ***) added to the name of the file formed by the application.

Effects of the Embodiment 7

In the image forming apparatus of the embodiment, the storing unit in which the non-target application data showing the application name out of the limitation targets of the high-density printing has been stored is provided. When the print information including the print attribute information (comprising the application data showing the application name of a print requesting source, the recording paper dimension data showing the dimensions of the recording paper, the image resolution data showing the resolution of the image, and the print color designation data indicative of either the color image or the monochromatic image) and the print data is received from the client apparatus, the print attribute information is obtained from the print information. On the basis of the application data of the obtained print attribute information, the storing unit is searched. If the non-target application data which coincides with the application data is not stored, it is decided that the printing is not permitted, and the printing process is stopped. Therefore, the consumption amount of the consumables can be suppressed. Thus, it is possible to prevent the consumables from being rapidly consumed.

Embodiment 8

Construction of the Embodiment 8

Figure 23:
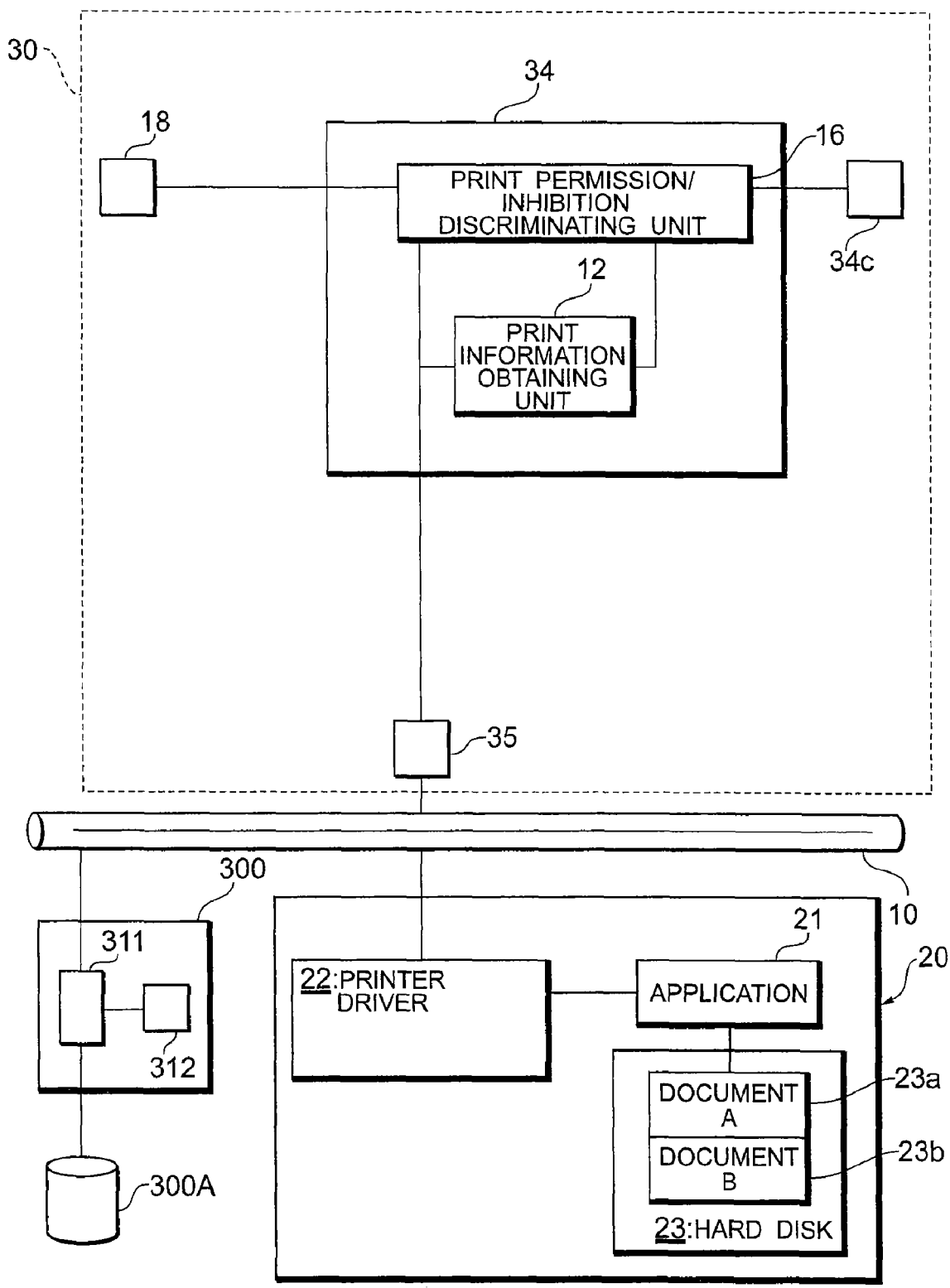
FIG. 23 is a block constructional diagram showing an image forming system in the embodiment 8.

FIG. 23 is a block constructional diagram showing an image forming system in the embodiment 8.

As shown in FIG. 23, the image forming system of the embodiment 8 is constructed by the image forming apparatus 30, client apparatus 20, and managing apparatus 300. The client apparatus 20 and the managing apparatus 300 are connected to the image forming apparatus 30 through the network. The database 300A is connected to the managing apparatus 300.

Although the embodiment 7 has the construction in which the pixel limit density information and the discrimination control information have been stored in the storing unit 33, the embodiment 8 has a construction in which the non-target application data is held in the database 300A and the managing apparatus 300 unitarily manages those information in the database 300A.

The database 300A is a database in which the non-target application data has been stored. As shown in FIG. 21, the non-target application data is information showing the application name out of the limitation targets of the high-density printing. In the embodiment, the information showing the application name such as word processor software, spreadsheet software, E-mail software, or the like in which it is presumed that a print request of the image data of the high density is not made has been stored as non-target application data.

When the print information obtaining unit 12 obtains the print attribute information, the print permission/inhibition discriminating unit 16 of the image forming apparatus 30 of the embodiment sends the data request signal to obtain the non-target application data showing the application name out of the limitation targets of the high-density printing to the managing apparatus 300.

The control unit 311 of the managing apparatus 300 is a control unit which functions as so called a CPU and integratedly controls the managing apparatus 300. When the data request signal is received, the control unit 311 transfers the data request signal to the data obtaining unit 312.

The data obtaining unit 312 is an obtaining unit to obtain the data from the database 300A. When the data request signal is received, the data obtaining unit 312 obtains all of the non-target application data with reference to the database 300A.

When the data obtaining unit 312 completes the data obtainment, the control unit 311 sends all of the obtained non-target application data to the image forming apparatus 30.

When the control unit 34 of the image forming apparatus 30 receives the non-target application data, it stores all of those data into the memory (not shown).

When all of the non-target application data is stored into the memory, the print permission/inhibition discriminating unit 16 searches the memory on the basis of the application data of the print attribute information. If the non-target application data showing the application name which coincides with the application data has been held, the print permission/inhibition discriminating unit 16 determines that the printing is permitted.

If the print permission/inhibition discriminating unit 16 determines that the printing is permitted, the print processing unit 34c transfers the image data to the print unit (not shown) and instructs the printing process. When the image data is received, the print unit (not shown) executes the printing process based on the image data.

When the print processing unit 34c instructs the print unit (not shown) to execute the printing process, the notifying unit 18 sends the print permission signal indicative of the print validation to the client apparatus 20.

When the print permission signal is received, the client apparatus 20 executes the control program in the memory (not shown) and makes the display unit (not shown) operative so as to display the print validation display screen showing the print validation. Thus, the user can confirm through the display unit (not shown) that the printing process has been executed in response to the print request.

If the non-target application data showing the application name which coincides with the application data is not held, the print permission/inhibition discriminating unit 16 determines that the printing is not permitted.

If the print permission/inhibition discriminating unit 16 determines that the printing is not permitted, the print processing unit 34c instructs the print unit (not shown) to stop the printing process.

When the print processing unit 34c instructs the print unit (not shown) to stop the printing process, the notifying unit 18 sends the print non-permission signal indicative of the print invalidation to the client apparatus 20.

When the print non-permission signal is received, the client apparatus 20 executes the control program in the memory (not shown) and makes the display unit (not shown) operative so as to display the print invalidation display screen showing the print invalidation. Thus, the user decides that the print-requested image data has been formed by the application which executes the high-density printing. The user can confirm through the display unit (not shown) that the printing process has been stopped.

In the embodiment, the non-target application data such as "word processor software", "spreadsheet software", and "E-mail software" (refer to FIG. 21) is obtained from the database 300A and since the application data included in the print attribute information indicates the "image editing software", by the search of the memory based on the application data of the "image editing software" by the print permission/inhibition discriminating unit 16, it is detected that the non-target application data which coincides with the application data of the "image editing software" is not held, so that it is decided that the printing is not permitted. The print processing unit 34c instructs the print unit (not shown) to stop the printing process and the notifying unit 18 sends the print non-permission signal to the client apparatus 20. The print invalidation display screen is displayed to the display unit (not shown) of the client apparatus 20.

Although the embodiment has been described with respect to the example in which the permission or inhibition of the printing is discriminated by the application name, the invention is not limited to such an example but, for example, it is also possible to use a construction in which the permission or inhibition of the printing is discriminated by an identifier (=file name. ***) added to the name of the file formed by the application.

Operation of the Embodiment 8

The print limiting operation of the image forming system of the embodiment 8 will be described hereinbelow.

The operations which are executed after the print information obtaining unit 12 obtained the print attribute information and which differ from those in the embodiment 7 will be explained.

Figure 24:
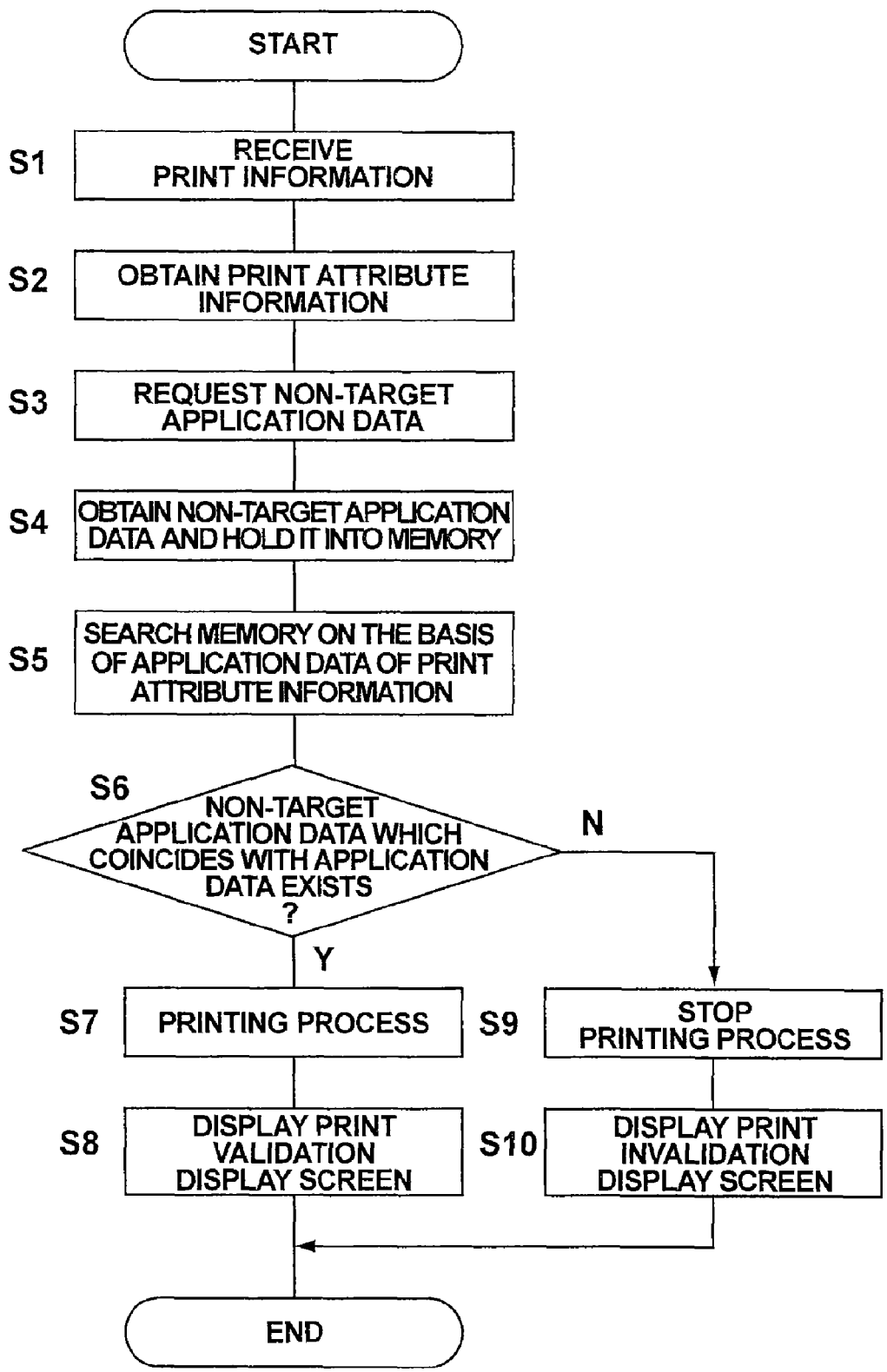
FIG. 24 is a flowchart showing the operation of the image forming system in the embodiment 8.

FIG. 24 is a flowchart for the operation of the image forming system in the embodiment 8.

When the print information obtaining unit 12 obtains the print attribute information, the print permission/inhibition discriminating unit 16 of the image forming apparatus 30 of the embodiment sends the data request signal to obtain the non-target application data showing the application name out of the limitation targets of the high-density printing to the managing apparatus 300 (S3).

When the data request signal is received, the control unit 311 of the managing apparatus 300 transfers the data request signal to the data obtaining unit 312.

When the data request signal is received, the data obtaining unit 312 obtains all of the non-target application data with reference to the database 300A.

When the data obtaining unit 312 completes the data obtainment, the control unit 311 sends all of the obtained non-target application data to the image forming apparatus 30.

When the control unit 34 of the image forming apparatus 30 receives the non-target application data, it stores all of those data into the memory (not shown) (S4).

When all of the non-target application data is stored into the memory, the print permission/inhibition discriminating unit 16 searches the memory on the basis of the application data of the print attribute information (S5). If the non-target application data showing the application name which coincides with the application data has been held, the print permission/inhibition discriminating unit 16 determines that the printing is permitted (S6).

If the print permission/inhibition discriminating unit 16 determines that the printing is permitted, the print processing unit 34c transfers the image data to the print unit (not shown) and instructs the printing process. When the image data is received, the print unit (not shown) executes the printing process on the basis of the image data (S7).

When the print processing unit 34c instructs the print unit (not shown) to execute the printing process, the notifying unit 18 sends the print permission signal indicative of the print validation to the client apparatus 20.

When the print permission signal is received, the client apparatus 20 executes the control program in the memory (not shown) and makes the display unit (not shown) operative so as to display the print validation display screen showing the print validation. Thus, the user can confirm through the display unit (not shown) that the printing process has been executed in response to the print request.

If the non-target application data showing the application name which coincides with the application data is not held, the print permission/inhibition discriminating unit 16 determines that the printing is not permitted (S6).

If the print permission/inhibition discriminating unit 16 determines that the printing is not permitted, the print processing unit 34c instructs the print unit (not shown) to stop the printing process (S9).

When the print processing unit 34c instructs the print unit (not shown) to stop the printing process, the notifying unit 18 sends the print non-permission signal indicative of the print invalidation to the client apparatus 20.

When the print non-permission signal is received, the client apparatus 20 executes the control program in the memory (not shown) and makes the display unit (not shown) operative so as to display the print invalidation display screen showing the print invalidation (S10). Thus, the user decides that the print-requested image data has been formed by the application which executes the high-density printing. The user can confirm through the display unit (not shown) that the printing process has been stopped.

In the embodiment, the non-target application data such as "word processor software", "spreadsheet software", and "E-mail software" (refer to FIG. 21) is obtained from the database 300A and since the application data included in the print attribute information indicates the "image editing software", by the search of the memory based on the application data of the "image editing software" by the print permission/inhibition discriminating unit 16, it is detected that the non-target application data which coincides with the application data of the "image editing software" is not held, so that it is decided that the printing is not permitted. The print processing unit 34c instructs the print unit (not shown) to stop the printing process and the notifying unit 18 sends the print non-permission signal to the client apparatus 20. The print invalidation display screen is displayed to the display unit (not shown) of the client apparatus 20.

Although the embodiment has been described with respect to the example in which the permission or inhibition of the printing is discriminated by the application name, the invention is not limited to such an example but, for example, it is also possible to use a construction in which the permission or inhibition of the printing is discriminated by an identifier (=file name. ***) added to the name of the file formed by the application.

Effects of the Embodiment 8

In the image forming system of the embodiment, the database 300A in which the non-target application data showing the application name out of the limitation targets of the high-density printing has been stored is unitarily managed by the managing apparatus 300. When the print information including the print attribute information (comprising the application data showing the application name of the print requesting source, the recording paper dimension data showing the dimensions of the recording paper, the image resolution data showing the resolution of the image, and the print color designation data indicative of either the color image or the monochromatic image) and the print data is received from the client apparatus 20, the print attribute information is obtained from the print information. The non-target application data which is obtained from the database 300A through the managing apparatus 300 is held in the memory. The memory is searched on the basis of the application data of the obtained print attribute information. If the non-target application data which coincides with the application data is not stored, it is decided that the printing is not permitted, and the printing process of the image data is stopped. Therefore, the consumption amount of the consumables can be suppressed. Thus, it is possible to prevent the consumables from being rapidly consumed. Since the database 300A in which the non-target application data has been stored is unitarily managed by the managing apparatus 300, there is no need to update the pixel limit density information every image forming apparatus 30 and the non-target application data can be easily updated.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus which executes an image creation on the basis of image creation data including a first document identifier, comprising:

an input unit which inputs said image creation data including the first document identifier;

a storing unit which previously stores one or more second document identifiers for limiting an output;

a setting unit for receiving an entry of a new second document identifier in an input field, judging whether the new second document identifier is correct and
   i) displaying a message showing that the new second document identifier is incorrect if the new second document identifier is determined to be incorrect, or
   ii) setting the new second document identifier into the storing unit as one of the one or more second document identifiers if the new second document identifier is determined to be correct, wherein the setting unit further judges whether or not a correct page number has been inputted to a second input field and if the correct page number is not inputted to the second input field, a message showing that the page number is incorrect is displayed;

a discriminating unit which discriminates permission or inhibition of the output on the basis of said one or more second document identifiers stored in said storing unit and said first document identifier included in the inputted image creation data, wherein the setting unit accepts an input including a wild card indicative of an arbitrary character train as a second document identifier, wherein, when the wild card is not included in the second document identifier, the discriminating unit discriminates about coincidence or dissidence between the first document identifier and the second document identifier, and if the first document identifier does not coincide with the second document identifier, the discriminating unit determines that the printing is not permitted, and if the first document identifier coincides with the second document identifier, the discriminating unit determines that the printing is permitted, and wherein, when the wild card is included in the second document identifier, the discriminating unit discriminates about coincidence or dissidence between the first document identifier and the second document identifier by regarding each character of the arbitrary character train as being coincident with a corresponding character of the first document identifier, and if the first document identifier is discriminated as being dissident from the second document identifier, the discriminating unit determines that the printing is not permitted, and if the first document identifier is discriminated as being coincident with the second document identifier, the discriminating unit determines that the printing is permitted.

2. The apparatus according to claim 1, wherein
said image creation data includes first image creation information,
said storing unit previously stores second image creation information, and
said discriminating unit discriminates the permission or inhibition of the output on the basis of said one or more second document identifiers and said second image creation information stored in said storing unit and said first document identifier and said first image creation information included in the inputted image creation data.

3. The apparatus according to claim 2, wherein each of said first image creation information and said second image creation information includes at least one of the number of pages, a sheet size, and a media type.

4. The apparatus according to claim 1, further comprising a notifying unit which notifies that said discriminating unit has determined that the output is not permitted.

5. The apparatus according to claim 1, wherein each of said first document identifier and said one or more second document identifiers is a document name.

6. The apparatus according to claim 1, wherein
said first document identifier is application data showing an application name of a print requesting source of an upper apparatus,
said one or more second document identifiers are non-target application data showing an application name of an application which creates the image creation data in the upper apparatus,
said image forming apparatus has a print information obtaining unit which obtains the application data from print information of said image creation data,
said discriminating unit has a print permission/inhibition discriminating unit which searches said storing unit on the basis of said obtained application data as said first document identifier and, if the non-target application data as a second document identifier which coincides with said application data is not stored, determines that printing is not permitted, and
said image forming apparatus has a print processing unit which stops said image creation when said print permission/inhibition discriminating unit determines that the printing is not permitted.

7. An image forming system which executes an image creation on the basis of image creation data including a first document identifier, comprising:
an input unit which inputs said image creation data including the first document identifier;
a storing unit which previously stores one or more second document identifiers for limiting an output;
a setting unit for receiving an entry of a new second document identifier in an input field, judging whether the new second document identifier is correct, and
  i) displaying a message showing that the new second document identifier is incorrect if the new second document identifier is determined to be incorrect, or
  ii) setting the new second document identifier into the storing unit as one of the one or more second document identifiers if the new second document identifier is determined to be correct,
wherein the setting unit further judges whether or not a correct page number has been inputted to a second input field and if the correct page number is not inputted to the second input field, a message showing that the page number is incorrect is displayed;
a discriminating unit which discriminates permission or inhibition of the output on the basis of said one or more second document identifiers stored in said storing unit and said first document identifier included in the inputted image creation data, wherein the setting unit accepts an input including a wild card indicative of an arbitrary character train as a second document identifier,
wherein, when the wild card is not included in the second document identifier, the discriminating unit discriminates about coincidence or dissidence between the first document identifier and the second document identifier, and if the first document identifier does not coincide with the second document identifier, the discriminating unit determines that the printing is not permitted, and if the first document identifier coincides with the second document identifier, the discriminating unit determines that the printing is permitted, and
wherein, when the wild card is included in the second document identifier, the discriminating unit discriminates about coincidence or dissidence between the first document identifier and the second document identifier by regarding each character of the arbitrary character train as being coincident with a corresponding character of the first document identifier, and if the first document identifier is discriminated as being dissident from the second document identifier, the discriminating unit determines that the printing is not permitted, and if the first document identifier is discriminated as being coincident with the second document identifier, the discriminating unit determines that the printing is permitted.

8. The system according to claim 7, wherein
said first document identifier is application data showing an application name of a print requesting source of an upper apparatus,
said one or more second document identifiers are non-target application data showing an application name of an application which creates the image creation data in the upper apparatus,
said image forming system has a print information obtaining unit which obtains the application data from print information of said image creation data,
said discriminating unit has a print permission/inhibition discriminating unit which searches said storing unit on the basis of said obtained application data as said first document identifier and, if the non-target application data as a second document identifier which coincides with said application data is not stored, determines that printing is not permitted, and said image forming system has a print processing unit which stops said image creation when said print permission/inhibition discriminating unit determines that the printing is not permitted.

9. The system according to claim 7, wherein said image creation data includes first image creation information, said storing unit previously stores second image creation information, and said discriminating unit discriminates the permission or inhibition of the output on the basis of said one or more second document identifiers and said second image creation information stored in said storing unit and said first document identifier and said first image creation information included in the inputted image creation data.

10. The system according to claim 9, wherein each of said first image creation information and said second image creation information includes at least one of the number of pages, a sheet size, and a media type.

11. The system according to claim 7, further comprising a notifying unit which notifies that said discriminating unit has determined that the output is not permitted.

12. The system according to claim 7, wherein each of said first document identifier and said one or more second document identifiers is a document name.

13. An image forming apparatus comprising:

a first document identifier being application data showing an application name of a print requesting source of an upper apparatus, a second document identifier being non-target application data showing an application name of an application which creates the image creation data in the upper apparatus, a print information obtaining unit which obtains the application data from print information of said image creation data, a setting unit for receiving an entry of a new second document identifier in an input field, judging whether the new second document identifier is correct, and
  i) displaying a message showing that the new second document identifier is incorrect if the new second document identifier is determined to be incorrect, or
  ii) setting the new second document identifier into a storing unit if the new second document identifier is determined to be correct,
  wherein the setting unit further judges whether or not a correct page number has been inputted to a second input field and if the correct page number is not inputted to the second input field, a message showing that the page number is incorrect is displayed;

a discriminating unit including a print permission/inhibition discriminating unit which searches the storing unit on the basis of said obtained application data as said first document identifier and, if the non-target application data as a second document identifier which coincides with said application data is not stored, determines that printing is not permitted, and a print processing unit which stops said image creation when said print permission/inhibition discriminating unit determines that the printing is not permitted.

* * * * *